(12) United States Patent
Merlin et al.

(10) Patent No.: US 11,755,886 B2
(45) Date of Patent: Sep. 12, 2023

(54) PASSIVE POSITIONING WITH RADIO FREQUENCY SENSING LABELS

(71) Applicant: QUALCOMM Incorporated, San Diego, CA (US)

(72) Inventors: Simone Merlin, San Diego, CA (US); Jamie Menjay Lin, San Diego, CA (US); Brian Michael Buesker, San Diego, CA (US); Rui Liang, San Diego, CA (US); Daniel Hendricus Franciscus Dijkman, Haarlem (NL); Farhad Ghazvinian Zanjani, Almere (NL); Ilia Karmanov, Amsterdam (NL); Vamsi Vegunta, San Diego, CA (US); Harshit Joshi, San Diego, CA (US); Bibhu Mohanty, Del Mar, CA (US); Raamkumar Balamurthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/229,805

(22) Filed: Apr. 13, 2021

(65) Prior Publication Data

US 2022/0327360 A1    Oct. 13, 2022

(51) Int. Cl.
*G06N 3/00*    (2023.01)
*G06N 3/045*    (2023.01)
(Continued)

(52) U.S. Cl.
CPC .......... *G06N 3/045* (2023.01); *H04B 17/318* (2015.01); *H04W 16/20* (2013.01); *H04W 64/006* (2013.01)

(58) Field of Classification Search
CPC ...... G06N 3/045; G06N 3/084; H04B 17/318; H04W 16/20; H04W 64/006; G06F 18/24133; G01S 7/006; G01S 7/417
(Continued)

(56) References Cited

U.S. PATENT DOCUMENTS 9,964,468 B1    5/2018    Wu et al.
2017/0154140 A1    6/2017    Wilson
(Continued)

FOREIGN PATENT DOCUMENTS

WO    2016066820 A1    5/2016
WO    2020185209 A1    9/2020
(Continued)

OTHER PUBLICATIONS

Hashimoto S., et al., "A Notification Environment Using User-Installed Beacons", 2017 Tenth International Conference On Mobile Computing and Ubiquitous Network (ICMU), IPSJ, Oct. 3, 2017 (Oct. 3, 2017), pp. 1-4, XP033343501, DOI: 10.23919/ICMU.2017. 8330078 [retrieved on Apr. 2, 2018] Sections I-IV., figures 1-7.
(Continued)

*Primary Examiner* — Huy C Ho
(74) *Attorney, Agent, or Firm* — Qualcomm Incorporated

(57) ABSTRACT

Disclosed are systems, methods, and non-transitory media for performing radio frequency sensing detection operations. For instance, radio frequency data can be received that is associated with at least one wireless device. The radio frequency data can be based on radio frequency signals reflected from a first object and received by the at least one wireless device. Training label data can also be obtained (e.g., from a labeling device, from the at least one wireless device, etc.). The training label data can be based at least in part on the first object and input data (e.g., received by the labeling device, the at least one wireless device, etc.). A
(Continued)

sensing model can be generated based on the radio frequency data and the training label data.

56 Claims, 14 Drawing Sheets

(51) Int. Cl.
  *H04B 17/318* (2015.01)
  *H04W 16/20* (2009.01)
  *H04W 64/00* (2009.01)

(58) Field of Classification Search
  USPC ...................................................... 455/456.1
  See application file for complete search history.

(56) References Cited

U.S. PATENT DOCUMENTS

| | | |
|---|---|---|
| 2017/0246742 A1 | 8/2017 | Baroudi et al. |
| 2020/0166609 A1 | 5/2020 | Trotta et al. |
| 2021/0041548 A1 | 2/2021 | Chen et al. |
| 2022/0329330 A1 | 10/2022 | Merlin et al. |

FOREIGN PATENT DOCUMENTS

| | | | |
|---|---|---|---|
| WO | WO-2020185209 A1 * | 9/2020 | ............. G01S 13/50 |
| WO | 2021043126 A1 | 3/2021 | |

OTHER PUBLICATIONS

International Search Report and Written Opinion—PCT/US2022/018796—ISA/EPO—dated Jul. 20, 2022.

Le D., et al., "SomBe: Self-Organizing Map for Unstructured and Non-Coordinated iBeacon Constellations", 2018 IEEE International Conference on Pervasive Computing and Communications (PERCOM), IEEE, Mar. 19, 2018 (Mar. 19, 2018), pp. 1-10, XP033391425, DOI: 10.1109/PERCOM.2018.8444584 [retrieved on Aug. 22, 2018] Section IV, figures 1-5.

Li X., et al., "Design and Implementation of Indoor Positioning System Based on iBeacon", 2016 International Conference on Audio, Language and Image Processing (ICALIP), IEEE, Jul. 11, 2016 (Jul. 11, 2016), pp. 126-130, XP033061936, DOI: 10.1109/ICALIP.2016.7846648 [retrieved on Feb. 7, 2017] paragraph [02.2]—paragraph [04.2] figures 1-5.

Yang Y., et al., "Using iBeacon for Intelligent in-Room Presence Detection", 2016 IEEE International Multi-Disciplinary Conference on Cognitive Methods in Situation Awareness and Decision Support (COGSIMA), IEEE, Mar. 21, 2016 (Mar. 21, 2016), pp. 187-191, XP032915685, DOI: 10.1109/COGSIMA.2016.7497808 [retrieved on Jun. 22, 2016] Sections I, II and III, p. 1-p. 3, Figures 1,2, 4.

* cited by examiner

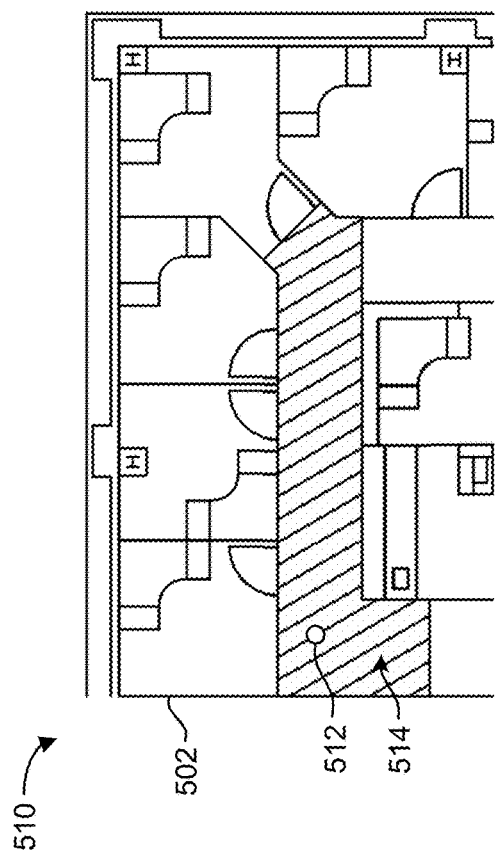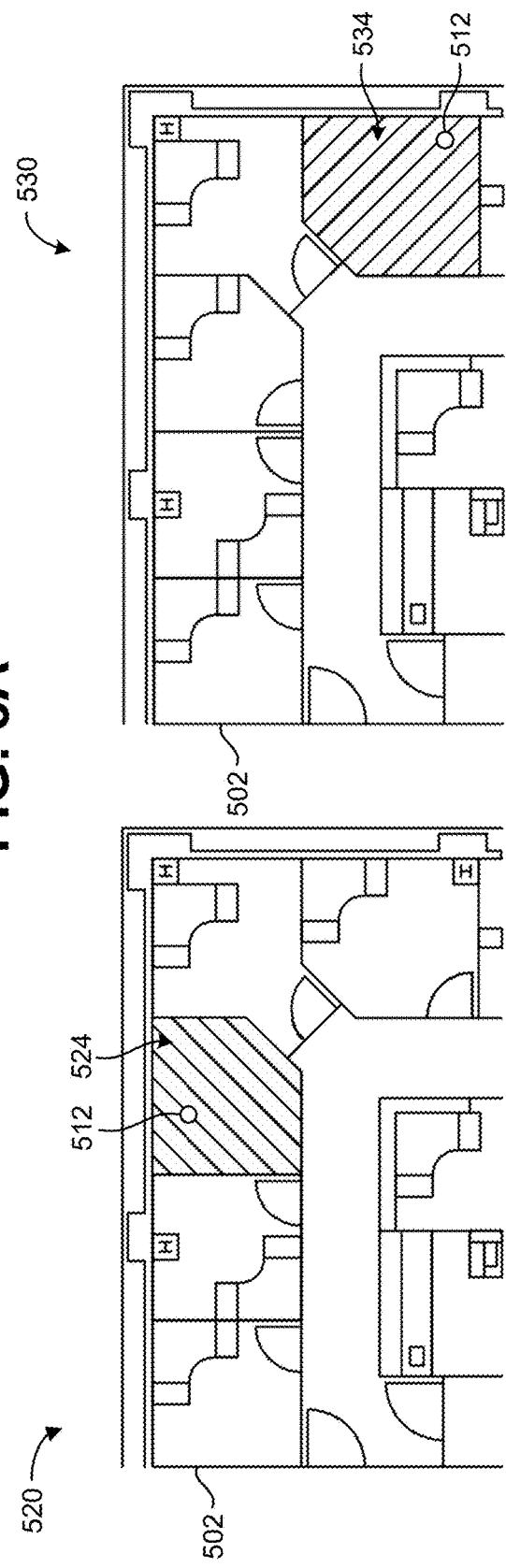

PASSIVE POSITIONING WITH RADIO FREQUENCY SENSING LABELS

FIELD OF THE DISCLOSURE

Aspects of the disclosure relate generally to wireless positioning and the like. In some implementations, examples are described for providing passive positioning with radio frequency (RF) sensing labeling.

BACKGROUND OF THE DISCLOSURE

Wireless sensing devices are capable of providing radio frequency features that can be used to detect objects in a given environment. For example, radio frequency sensing devices can include software and hardware components that can be distributed throughout an environment and can be configured to track users moving throughout the environment. In order to implement various telecommunications functions, wireless sensing devices can include hardware and software components that are configured to transmit and receive radio frequency (RF) signals. For example, a wireless device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for sensing radio frequency signals. According to at least one example, a method is provided for training one or more sensing models. The method can include: receiving radio frequency data associated with at least one wireless device, the radio frequency data being based on radio frequency signals reflected from a first object and received by the at least one wireless device; obtaining training label data, the training label data being based at least in part on the first object and input data; and generating a sensing model based on the radio frequency data and the training label data.

In another example, an apparatus for training one or more sensing models is provided that includes at least one network interface, at least one memory, and at least one processor (e.g., configured in circuitry) coupled to the at the one memory. The at least one processor is configured to: receive, via the at least one network interface, radio frequency data associated with at least one wireless device, the radio frequency data being based on radio frequency signals reflected from a first object and received by the at least one wireless device; obtain training label data, the training label data being based at least in part on the first object and input data and generate a sensing model based on the radio frequency data and the training label data.

In another example, a non-transitory computer-readable storage medium is provided that comprises at least one instruction for causing a computer or processor to: receive radio frequency data associated with at least one wireless device, the radio frequency data being based on radio frequency signals reflected from a first object and received by the at least one wireless device; obtain training label data, the training label data being based at least in part on the first object and input data; and generate a sensing model based on the radio frequency data and the training label data.

In another example, an apparatus for training one or more sensing models is provided. The apparatus includes: means for receiving radio frequency data associated with at least one wireless device, the radio frequency data being based on radio frequency signals reflected from a first object and received by the at least one wireless device; means for obtaining training label data, the training label data being based at least in part on the first object and input data; and means for generating a sensing model based on the radio frequency data and the training label data.

In some aspects, the apparatus is or is part of a wireless device, such as mobile device (e.g., a mobile telephone or so-called "smart phone" or other mobile device), a wearable device, an extended reality device (e.g., a virtual reality (VR) device, an augmented reality (AR) device, or a mixed reality (MR) device), a tablet, a personal computer, a laptop computer, a server computer, a wireless access point, a vehicle or component of a vehicle, or other any other device having an RF interface.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 5A-5C are diagrams illustrating examples of object detection utilizing a distributed sensing system, in accordance with some examples;

DETAILED DESCRIPTION

Figure 1:
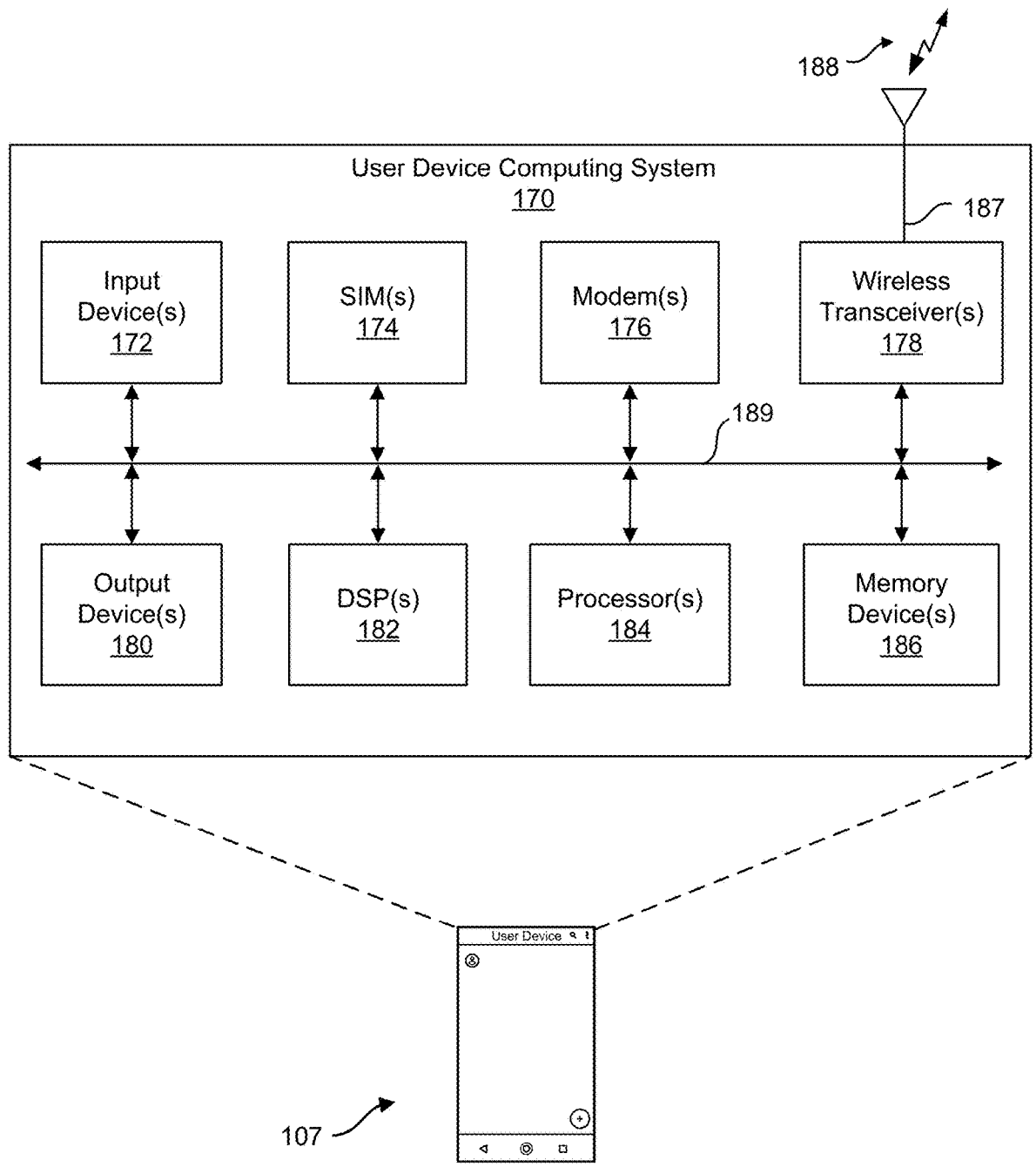
FIG. 1 is a block diagram illustrating an example of a computing system of a user device, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Many sensing devices (e.g., portable electronic devices, smartphones, tablets, laptops, and WiFi mesh Access Points) are capable of performing radio frequency sensing (also referred to as RF sensing). For example, sensing devices can utilize RF sensing techniques to perform object detection (e.g., determining that an intruder has entered the premises). RF sensing has many applications, such as tracking object movement, providing home and business security, among others.

In some examples, radio frequency sensing can utilize signals (e.g., WiFi signals, 3GPP signals, Bluetooth™ signals, etc.) to detect and characterize changes in an environment, such as passive positioning or motion of people and activity characterization. For instance, a radio frequency sensing system, as described herein, can analyze communications associated with wireless devices (e.g., WiFi Access Points or other devices), which can be referred to as sensing devices, to provide accurate detection of one or more moving objects (e.g., a person or other object) in an environment. Examples of sensing detection operations include detecting motion (e.g., presence of motion or lack of motion or no-motion), motion patterns (e.g., walking, falling, gestures, or other motion), motion location (e.g., a position), motion tracking (e.g., movement of an object, such as a person, over time), vital signs of a person or animal (e.g., breathing, heart rate, etc.), any combination thereof, and/or other information), among others. In one illustrative example, positioning of a moving object can be determined in a multi-room environment.

In some cases, a machine learning based system can be used to perform various sensing detection operations, such as position detection, motion detection, motion tracking, among others. Using labels and test or training data, the machine learning system can be trained to perform the sensing detection operations. However, it can be difficult to obtain enough labels to effectively train such a machine learning system. For instance, there may be instances where not enough information is available regarding detected objects and the environment.

Systems, apparatuses, processes (also referred to as methods), and computer-readable media (collectively referred to as "systems and techniques") are described herein for effectively and efficiently providing labels for performing radio frequency sensing detection operations (e.g., detecting motion or no motion, detecting motion patterns, detecting position/location of objects or people, motion tracking, detecting vital signs of a person or animal, and/or other operations). For example, the systems and techniques enable a radio frequency sensing system to provide and/or obtain labels that can be used to train a machine learning system to perform the radio frequency sensing operations. The radio frequency sensing system can be referred to as a distributed sensing system and can include distributed sensing devices deployed throughout an environment. The distributed sensing system can determine and/or receive labels (e.g., training labels) along with radio frequency sensing measurements during a training phase of distributed sensing system. In some cases, as described herein, a wireless device (e.g., a mobile phone, a camera system, a tablet device, a computer, or other device of a user) associated with a user (referred to as a labeling device) and/or a sensing device (e.g., an Access Point and/or other device that can receive RF signals and/or provide RF sensing data) can provide real-time labels to the distributed sensing system, such as manually provided user inputs, which can be associated with estimated channel conditions at the time the labels are generated. In some cases, the distributed sensing system can automatically determine position information of the wireless device, which can be used to generate labels associated with estimated channel conditions (e.g., radio frequency (RF) sensing measurement data) at the time the labels are generated. In some cases, the labels can be synchronized with RF sensing data by the distributed sensing system (e.g., to allow the RF sensing data to be accurately associated with the labels).

For example, the distributed sensing system can be configured to receive input labels from a labeling device (e.g., a mobile phone, a camera system, a tablet device, a computer, or other device of a user) and to also receive RF sensing data received by one or more sensing devices of the distributed sensing system. As noted above, in some cases, the one or more sensing devices can provide labels to the distributed sensing system (in addition to or as an alternative to the labeling devices). The one or more sensing devices can include access points (e.g., a Wi-Fi Access Point) and/or other device that can receive RF signals and/or provide RF sensing data. The distributed sensing system can synchronize the collected labels with the RF sensing data so that the RF sensing data is accurately associated with the labels. One or more machine learning models (e.g., neural networks) can be utilized by the distributed sensing system to perform sensing operations (e.g., position, motion, etc.) once the machine learning system is trained using the labels received from labeling devices. While the systems and techniques are described herein with respect to performing radio frequency sensing detection operations of animate objects (e.g., a person), the systems and techniques can be used to perform radio frequency sensing of other objects, such as, inanimate objects, e.g., walls, furniture, doors, etc.

As noted above, the distributed sensing system can include or be in communication with one or more labeling devices and/or the one or more sensing devices can provide labels. In some examples, the one or more labeling devices and/or sensing devices can include a static camera system, which can be used to generate and/or determine labels. For example, a camera can be configured to capture images (e.g., pictures or video) of locations and objects of interest in an environment, such as a home or company building. In some aspects, the static camera system can utilize algorithms described herein (e.g., such as those illustrated in FIGS. 6 and 7) to detect objects, persons, and activities of interest (e.g., movement by the objects) and generate corresponding labels for the detected objects and activities of interest. For instance, a label of "kitchen" can be assigned when a person is detected in a kitchen of a building. In some aspects, a label can include coordinates of the detected person, e.g., in meters, with respect to a reference system defined for the building. In some aspects, the static camera system can timestamp the generated labels (e.g., training labels) and provide the labels to the distributed sensing system for sensing purposes as described herein. The labels can be associated with RF sensing data that is obtained by one or more sensing devices of the distributed sensing system. For instance, continuing with the example above, the label of "kitchen" can be associated with RF sensing data that is received by the one or more sensing devices when the person is located in the kitchen.

In some implementations, during a deployment training phase of a machine learning system of the distributed sensing system, the distributed sensing system can utilize one or more inertial measurement unit (IMU) sensors (e.g., accelerometers, gyroscopes, etc.) and/or simultaneous location and mapping (SLAM) techniques (e.g., where IMU data and image data can be used in combination) to determine a position of a device for sensing purposes, as described herein. In some aspects, the device can be carried by the user or by the object that is a target of sensing detection, thereby providing the location of the target to be used as a label for the training of machine learning models. In some cases, the distributed sensing system can utilize visual simultaneous localization and mapping (VSLAM), which is a computational geometry technique used in devices with cameras, such as robots, head-mounted displays (HMDs), mobile handsets, and autonomous vehicles. The position determined by the device can be utilized as training label data, for example, to perform training operations of a machine learning system utilized by the distributed sensing system to perform radio frequency sensing detection operations.

In some implementations, during a deployment training phase of a machine learning system of the distributed sensing system, a user can utilize a wireless device (e.g., a sensing measuring device or a labeling device, such as a mobile device) to map the topology of a given space, for example, by walking across various rooms to map a floorplan of a building. In some aspects, the wireless device associated with the user can be configured to transmit and receive RF sensing signals, determine RF sensing measurements based on the RF sensing signals (e.g., received signal strength indicator (RSSI) data, channel state information (CSI) data, and/or other RF sensing data such as round trip time measurements as described herein), and provide the RF sensing measurements and location labels to the distributed sensing system for sensing purposes as described herein.

During training of the machine learning system of the distributed sensing system, weights and/or other parameters of nodes of the machine learning system can be tuned or adjusted using a training process called backpropagation. As described in more detail below with respect to FIG. 11 and FIG. 12, a backpropagation process can include a forward pass, a loss function, a backward pass, and a weight update. The forward pass, loss function, backward pass, and parameter update is performed for one training iteration. The process can be repeated for a certain number of iterations for each set of training data (e.g., including the training label data described above) until the machine learning system is trained well enough so that the weights and/or other parameters are accurately tuned.

Various aspects of the systems and techniques described herein will be discussed below with respect to the figures. FIG. 1 illustrates an example of a computing system 170 of a user device 107. The user device 107 is an example of a device that can be used by an end-user. For example, the user device 107 can include a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some cases, the device can be referred to as a station (STA), such as when referring to a device configured to communicate using the Wi-Fi standard. In some cases, the device can be referred to as user equipment (UE), such as when referring to a device configured to communicate using 5G/New Radio (NR), Long-Term Evolution (LTE), or other telecommunication standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network devices (e.g., base stations such as eNBs and/or gNBs, WiFi access points (APs) such as routers, range extenders or the like, etc.), cloud networks, and/or the like. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle signal selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the user device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a WiFi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 2:
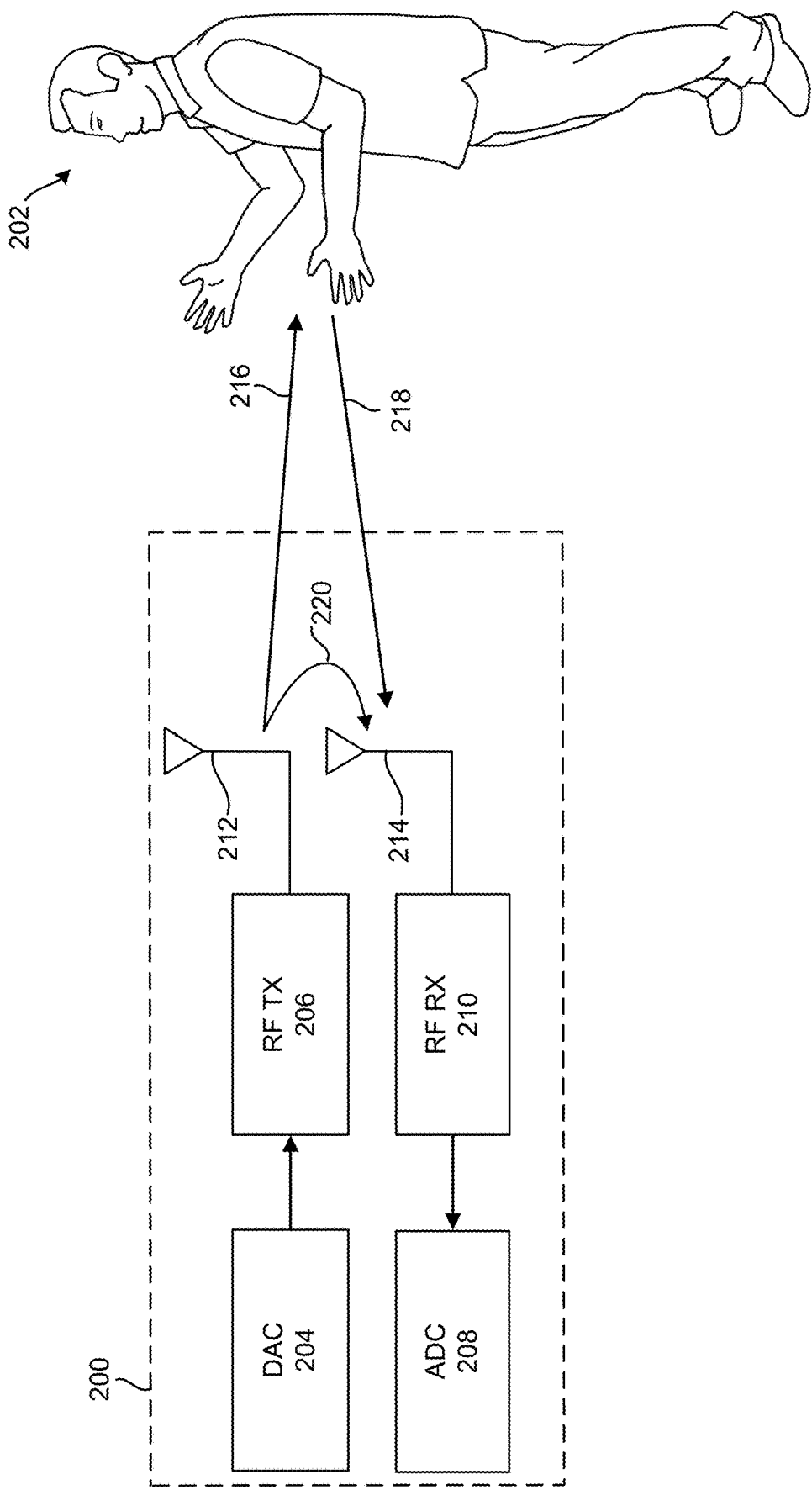
FIG. 2 is a diagram illustrating an example of a wireless device utilizing radio frequency (RF) sensing techniques to detect user presence and perform facial recognition, in accordance with some examples.

FIG. 2 is a diagram illustrating an example of a wireless device 200 that utilizes RF sensing techniques to perform one or more functions, such as detecting a presence of a user 202, detecting orientation characteristics of the user, performing motion detection, any combination thereof, and/or perform other functions. In some examples, the wireless device 200 can be the user device 107, such as a mobile phone, a tablet computer, a wearable device, or other device that includes at least one RF interface. In some examples, the wireless device 200 can be a device that provides connectivity for a user device (e.g., for user device 107), such as a wireless access point (AP), a base station (e.g., a gNB, eNB, etc.), or other device that includes at least one RF interface.

In some aspects, wireless device 200 can include one or more components for transmitting an RF signal. Wireless device 200 can include a digital-to-analog converter (DAC) 204 that is capable of receiving a digital signal or waveform (e.g., from a microprocessor, not illustrated) and converting the signal or waveform to an analog waveform. The analog signal that is the output of DAC 204 can be provided to RF transmitter 206. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as TX antenna 212. In some examples, TX antenna 212 can be an omnidirectional antenna that is capable of transmitting an RF signal in all directions. For example, TX antenna 212 can be an omni-directional Wi-Fi antenna that can radiate Wi-Fi signals (e.g., 2.4 GHz, 5 GHz, 6 GHz, etc.) in a 360-degree radiation pattern. In another example, TX antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as RX antenna 214. In some examples, RX antenna 214 can be an omni-directional antenna capable of receiving RF signals from multiple directions. In other examples, RX antenna 214 can be a directional antenna that is configured to receive signals from a particular direction. In further examples, both TX antenna 212 and RX antenna 214 can include multiple antennas (e.g., elements) configured as an antenna array.

Wireless device 200 can also include an RF receiver 210 that is coupled to RX antenna 214. RF receiver 210 can include one or more hardware components for receiving an RF waveform such as a Wi-Fi signal, a Bluetooth™ signal, a 5G/NR signal, or any other RF signal. The output of RF receiver 210 can be coupled to an analog-to-digital converter (ADC) 208. ADC 208 can be configured to convert the received analog RF waveform into a digital waveform that can be provided to a processor such as a digital signal processor (not illustrated).

In one example, wireless device 200 can implement RF sensing techniques by causing TX waveform 216 to be transmitted from TX antenna 212. Although TX waveform 216 is illustrated as a single line, in some cases, TX waveform 216 can be transmitted in all directions by an omnidirectional TX antenna 212. In one example, TX waveform 216 can be a Wi-Fi waveform that is transmitted by a Wi-Fi transmitter in wireless device 200. In some cases, TX waveform 216 can correspond to a Wi-Fi waveform that is transmitted at or near the same time as a Wi-Fi data communication signal or a Wi-Fi control function signal (e.g., a beacon transmission). In some examples, TX waveform 216 can be transmitted using the same or a similar frequency resource as a Wi-Fi data communication signal or a Wi-Fi control function signal (e.g., a beacon transmission). In some aspects, TX waveform 216 can correspond to a Wi-Fi waveform that is transmitted separately from a Wi-Fi data communication signal and/or a Wi-Fi control signal (e.g., TX waveform 216 can be transmitted at different times and/or using a different frequency resource).

In some examples, TX waveform 216 can correspond to a 5G NR waveform that is transmitted at or near the same time as a 5G NR data communication signal or a 5G NR control function signal. In some examples, TX waveform 216 can be transmitted using the same or a similar frequency resource as a 5G NR data communication signal or a 5G NR control function signal. In some aspects, TX waveform 216 can correspond to a 5G NR waveform that is transmitted separately from a 5G NR data communication signal and/or a 5G NR control signal (e.g., TX waveform 216 can be transmitted at different times and/or using a different frequency resource).

In some aspects, one or more parameters associated with TX waveform 216 can be modified that may be used to increase or decrease RF sensing resolution. The parameters may include frequency, bandwidth, number of spatial streams, the number of antennas configured to transmit TX waveform 216, the number of antennas configured to receive a reflected RF signal corresponding to TX waveform 216, the number of spatial links (e.g., number of spatial streams multiplied by number of antennas configured to receive an RF signal), the sampling rate, or any combination thereof.

In further examples, TX waveform 216 can be implemented to have a sequence that has perfect or almost perfect autocorrelation properties. For instance, TX waveform 216 can include single carrier Zadoff sequences or can include symbols that are similar to orthogonal frequency-division multiplexing (OFDM) Long Training Field (LTF) symbols. In some cases, TX waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can further implement RF sensing techniques by performing concurrent transmit and receive functions. For example, wireless device 200 can enable its RF receiver 210 to receive at or near the same time as it enables RF transmitter 206 to transmit TX waveform 216. In some examples, transmission of a sequence or pattern that is included in TX waveform 216 can be repeated continuously such that the sequence is transmitted a certain number of times or for a certain duration of time. In some examples, repeating a pattern in the transmission of TX waveform 216 can be used to avoid missing the reception of any reflected signals if RF receiver 210 is enabled after RF transmitter 206. In one example implementation, TX waveform 216 can include a sequence having a sequence length L that is transmitted two or more times, which can allow RF receiver 210 to be enabled at a time less than or equal to L in order to receive reflections corresponding to the entire sequence without missing any information.

By implementing simultaneous transmit and receive functionality, wireless device 200 can receive any signals that correspond to TX waveform 216. For example, wireless device 200 can receive signals that are reflected from objects or people that are within range of TX waveform 216, such as RX waveform 218 reflected from user 202. Wireless device 200 can also receive leakage signals (e.g., TX leakage signal 220) that are coupled directly from TX antenna 212 to RX antenna 214 without reflecting from any objects. For example, leakage signals can include signals that are transferred from a transmitter antenna (e.g., TX antenna 212) on a wireless device to a receive antenna (e.g., RX antenna 214) on the wireless device without reflecting from any objects. In some cases, RX waveform 218 can include multiple sequences that correspond to multiple copies of a sequence that are included in TX waveform 216. In some examples, wireless device 200 can combine the multiple sequences that are received by RF receiver 210 to improve the signal to noise ratio (SNR).

Wireless device 200 can further implement RF sensing techniques by obtaining RF sensing data associated with each of the received signals corresponding to TX waveform 216. In some examples, the RF sensing data can include channel state information (CSI) data relating to the direct paths (e.g., leakage signal 220) of TX waveform 216 together with data relating to the reflected paths (e.g., RX waveform 218) that correspond to TX waveform 216.

In some aspects, RF sensing data (e.g., CSI data) can include information that can be used to determine the manner in which an RF signal (e.g., TX waveform 216) propagates from RF transmitter 206 to RF receiver 210. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as RX waveform 218. In further examples, RF sensing data can also be used to detect motion, determine location, detect changes in location or motion patterns, obtain channel estimation, or any combination thereof. In some cases, the distance and angle of arrival of the reflected signals can be used to identify the size, position, movement, or orientation of users in the surrounding environment (e.g., user 202) in order to detect object presence/proximity, detect object attention, and/or perform motion detection.

Wireless device 200 can calculate distances and angles of arrival corresponding to reflected waveforms (e.g., the distance and angle of arrival corresponding to RX waveform 218) by utilizing signal processing, machine learning algorithms, using any other suitable technique, or any combination thereof. In other examples, wireless device 200 can send the RF sensing data to another computing device, such as a server, that can perform the calculations to obtain the distance and angle of arrival corresponding to RX waveform 218 or other reflected waveforms.

In one example, the distance of RX waveform 218 can be calculated by measuring the difference in time from reception of the leakage signal to the reception of the reflected signals. For example, wireless device 200 can determine a baseline distance of zero that is based on the difference from the time the wireless device 200 transmits TX waveform 216 to the time it receives leakage signal 220 (e.g., propagation delay). Wireless device 200 can then determine a distance associated with RX waveform 218 based on the difference from the time the wireless device 200 transmits TX waveform 216 to the time it receives RX waveform 218 (e.g., time of flight), which can then be adjusted according to the propagation delay associated with leakage signal 220. In doing so, wireless device 200 can determine the distance traveled by RX waveform 218 which can be used to determine the presence and movement of a user (e.g., user 202) that caused the reflection.

In further examples, the angle of arrival of RX waveform 218 can be calculated by measuring the time difference of arrival of RX waveform 218 between individual elements of a receive antenna array, such as antenna 214. In some examples, the time difference of arrival can be calculated by measuring the difference in received phase at each element in the receive antenna array.

In some cases, the distance and the angle of arrival of RX waveform 218 can be used to determine the distance between wireless device 200 and user 202 as well as the position of user 202 relative to wireless device 200. The distance and the angle of arrival of RX waveform 218 can also be used to determine presence, movement, proximity, attention, identity, or any combination thereof, of user 202. For example, wireless device 200 can utilize the calculated distance and angle of arrival corresponding to RX waveform 218 to determine that user 202 is walking towards wireless device 200. Based on the proximity of user 202 to wireless device 200, wireless device 200 can activate facial authentication in order to unlock the device. In some aspects, facial authentication can be activated based upon user 202 being within a threshold distance of wireless device 200. Examples of threshold distances can include 2 feet, 1 foot, 6 inches, 3 inches, or any other distance.

As noted above, wireless device 200 can include mobile devices (e.g., smartphones, laptops, tablets, access points, etc.) or other types of devices. In some examples, wireless device 200 can be configured to obtain device location data and device orientation data together with the RF sensing data. In some instances, device location data and device orientation data can be used to determine or adjust the distance and angle of arrival of a reflected signal such as RX waveform 218. For example, wireless device 200 may be set on a table facing the ceiling as user 202 walks towards it during the RF sensing process. In this instance, wireless device 200 can use its location data and orientation data together with the RF sensing data to determine the direction that the user 202 is walking.

In some examples, device position data can be gathered by wireless device 200 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
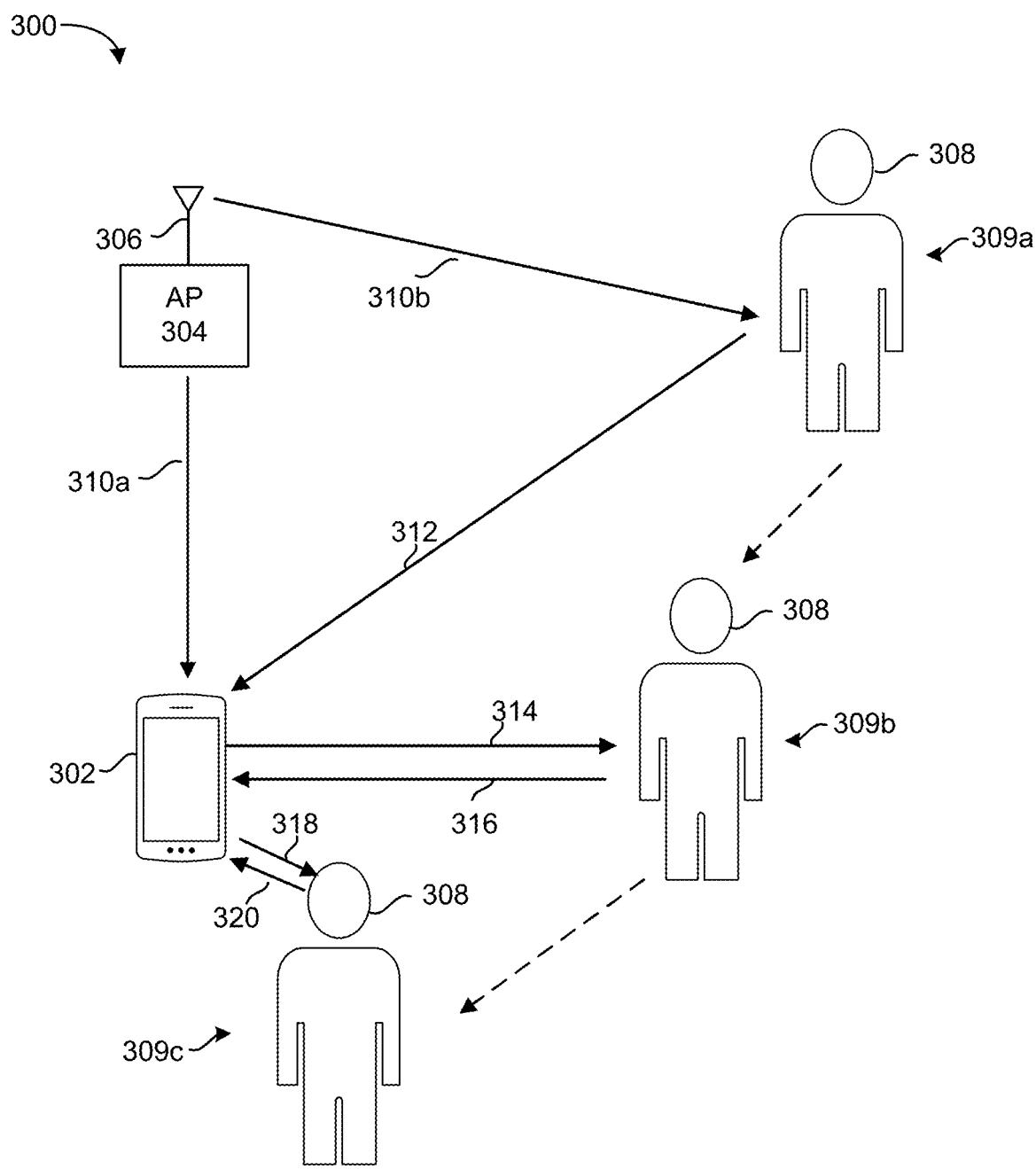
FIG. 3 is a diagram illustrating an example of an environment including wireless devices for detecting user presence and performing facial recognition, in accordance with some examples.

FIG. 3 is a diagram illustrating an environment 300 that includes a wireless device 302, an access point (AP) 304, and a user 308. The wireless device 302 can include a user device (e.g., user device 107 of FIG. 1, such as a mobile device or any other type of device). The AP 304 can also be referred to as a sensing device, a radio frequency sensing device, or a wireless device in some examples. As shown, the user 308 can move to different positions (e.g., with the wireless device 302), including a first user position 309a, a second user position 309b, and a third user position 309c. In some aspects, the wireless device 302 and AP 304 can each be configured to perform RF sensing in order to detect a presence of the user 308, detect movement of the user 308, any combination thereof, and/or perform other functions with respect to the user 308.

In some aspects, AP 304 can be a Wi-Fi access point that includes hardware and software components that can be configured to simultaneously transmit and receive RF signals, such as the components described herein with respect to the wireless device 200 of FIG. 2. For example, AP 304 can include one or more antennas that can be configured to transmit an RF signal and one or more antennas that can be configured to receive an RF signal (e.g., antenna 306). As noted with respect to the wireless device 200 of FIG. 2, AP 304 can include omnidirectional antennas or antenna arrays that are configured to transmit and receive signals from any direction.

In some aspects, the AP 304 and the wireless device 302 can be configured to implement a bistatic configuration in which the transmit and receive functions are performed by different devices. For example, AP 304 can transmit an omnidirectional RF signal that can include signal 310a and signal 310b. As illustrated, signal 310a can travel directly (e.g., no reflections) from AP 304 to wireless device 302 and signal 310b can reflect off of user 308 at position 309a and cause a corresponding reflected signal 312 to be received by wireless device 302.

In some examples, wireless device 302 can utilize RF sensing data associated with signal 310a and signal 310b to determine presence, location, orientation, and/or movement of user 308 at position 309a. For instance, wireless device 302 can obtain, retrieve, and/or estimate location data associated with AP 304. In some aspects, wireless device 302 can use location data associated with AP 304 and RF sensing data (e.g., CSI data) to determine the time of flight, distance, and/or the angle of arrival associated signals transmitted by AP 304 (e.g., direct path signals such as signal 310a and reflected path signals such as signal 312). In some cases, AP 304 and wireless device 302 can further send and/or receive communication that can include data associated with RF signal 310a and/or reflected signal 312 (e.g., transmission time, sequence/pattern, time of arrival, angle of arrival, etc.).

In some examples, the wireless device 302 can be configured to perform RF sensing using a monostatic configuration, in which case the wireless device 302 performs both the transmit and receive functions (e.g., simultaneous TX/RX discussed in connection with wireless device 200). For instance, wireless device 302 can detect a presence or movement of user 308 at position 309b by transmitting RF signal 314, which can cause a reflected signal 316 from user 308 at position 309b to be received by wireless device 302.

In some aspects, wireless device 302 can obtain RF sensing data associated with reflected signal 316. For example, RF sensing data can include CSI data corresponding to reflected signal 316. In further aspects, wireless device 302 can use the RF sensing data to calculate a distance and an angle of arrival corresponding to reflected signal 316. For instance, wireless device 302 can determine distance by calculating a time of flight for reflected signal 316 based on the difference between a leakage signal (not illustrated) and reflected signal 316. In further examples, wireless device 302 can determine an angle of arrival by utilizing an antenna array to receive the reflected signals and measuring the difference in received phase at each element of the antenna array.

In some examples, wireless device 302 can obtain RF sensing data in the form of CSI data that can be used to formulate a matrix that is based on the number of frequencies represented as 'K' (e.g., tones) and the number of antenna array elements represented as 'N'. In one technique, the CSI matrix can be formulated according to the relationship given by equation (1):

$$\text{CSI Matrix: } H=[h_{ik}], i=1, \ldots, N, k=1, \ldots, K \quad (1)$$

Upon formulating the CSI matrix, wireless device 302 can calculate the angle of arrival and time of flight for direct signal paths (e.g., leakage signals), as well as reflected signal paths (e.g., reflected signal 316) by utilizing a Two-Dimensional Fourier transform. In one example, a Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; l corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N}\sum_{k=1}^{K} h_{ik} e^{j\frac{2\pi f_0 i l \sin\theta}{c}} e^{j\frac{2\pi d k \Delta f}{c}} \quad (2)$$

In some aspects, leakage signals (e.g., leakage signal 220 and/or other leakage signals) can be cancelled by using an iterative cancellation method.

In some cases, wireless device 302 can utilize the distance and an angle of arrival corresponding to reflected signal 316 to detect a presence or movement of user 308 at position 309b. In other examples, wireless device 302 can detect further movement of the user 308 to a third position 309c. Wireless device 302 can transmit RF signal 318 that causes reflected signal 320 from user 308 at position 309c. Based on the RF sensing data associated with reflected signal 320, wireless device 302 can determine the presence of user 308 at position 309c, detect the user's head presence and/or orientation, and perform facial recognition as well as facial authentication.

In some implementations, wireless device 302 may utilize artificial intelligence or machine learning algorithms to perform motion detection, object classification, and/or detect head orientation relating to user 308. In some examples, the machine learning techniques can include supervised machine learning techniques such as those that utilize neural networks, linear and logistics regression, classification trees, support vector machine, any other suitable supervised machine learning technique, or any combination thereof. For instance, a dataset of sample RF sensing data can be selected for training of the machine learning algorithms or artificial intelligence.

In some aspects, wireless device 302 and AP 304 can perform RF sensing techniques irrespective of their association with each other or with a Wi-Fi network. For example, wireless device 302 can utilize its Wi-Fi transmitter and Wi-Fi receiver to perform RF sensing as discussed herein when it is not associated with any access point or Wi-Fi network. In further examples, AP 304 can perform RF sensing techniques regardless of whether it has any wireless devices associated with it.

The deployment of a radio frequency sensing system can be more effective and efficient when set-up of the radio frequency sensing system when utilizing labels along with sensing data. The feasibility or accuracy of sensing detections by the radio frequency sensing system can be a function of a position of the various sensing devices (e.g., Access Points) of the radio frequency sensing system. For example, if a user intends to deploy sensing devices at their home for positioning purposes, the user may need to be provided with a simple way to determine whether placement of the sensing devices is appropriate to cover areas of interest and also how to reposition the sensing devices and/or add new sensing devices to provide the best coverage for radio frequency sensing based detection (e.g., positioning, motion detection, vital sign detection, etc.) of objects. Furthermore, there may be instances where not enough information is available regarding detected objects and the environment. By providing labels, the radio frequency sensing system can provide additional information along with sensing data to a wireless device associated with a user.

Figure 4:
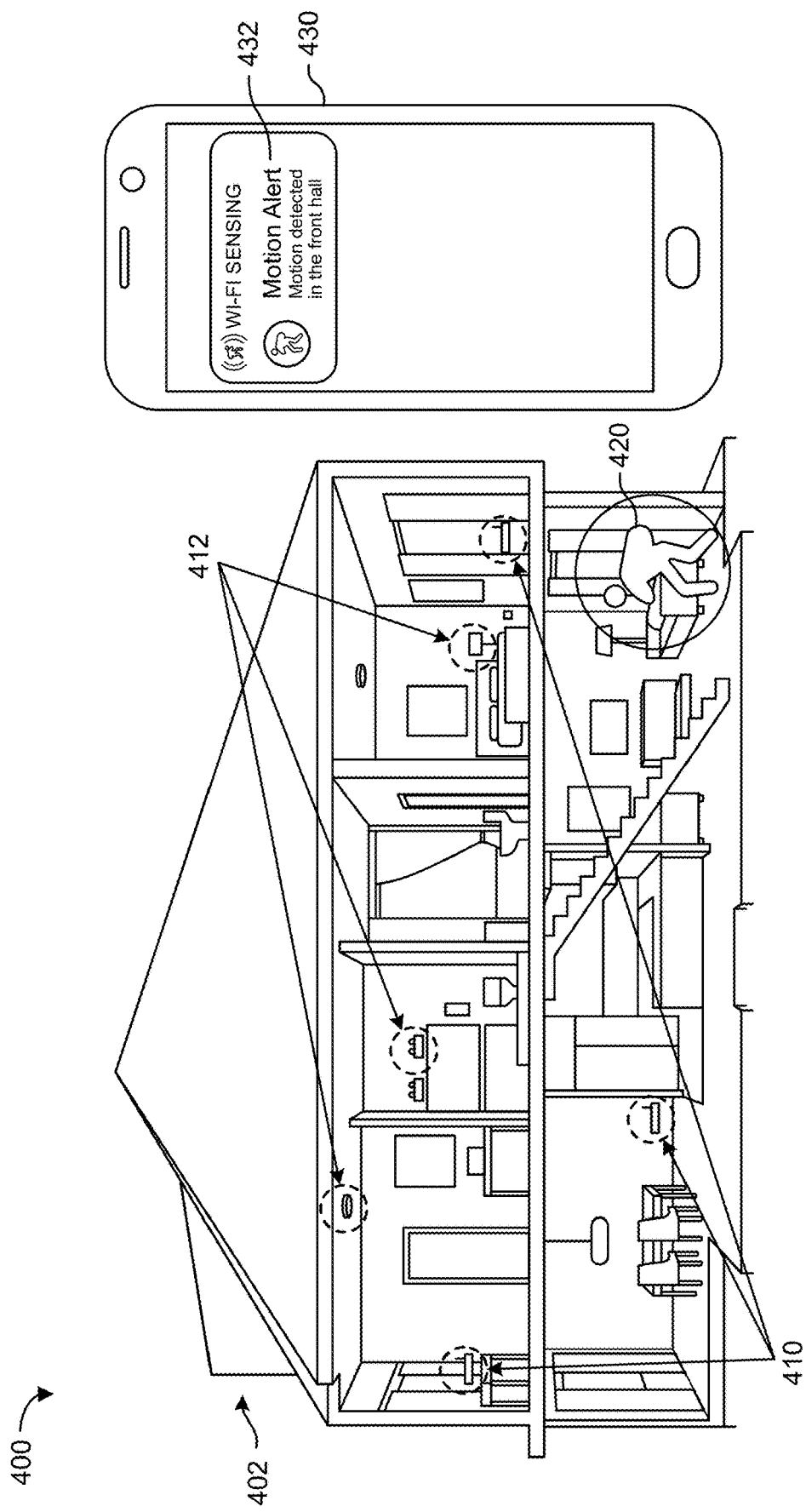
FIG. 4 is a diagram illustrating an example of a distributed sensing system, in accordance with some examples.

FIG. 4 is a diagram illustrating an example of a distributed sensing system 400 that can include a plurality of sensing devices, such as access points 410 and wireless devices 412. The distributed sensing system 400 can perform various radio frequency sensing based detections (e.g., detecting the presence of motion or lack of motion, detecting motion patterns such as walking, falling, gestures, or other motion, detection position of one or more objects, performing motion tracking of an object or person over time, detecting vital signs of a person or animal, any combination thereof, and/or other detections) based on radio frequency signals received by the sensing devices. The radio frequency sensing signals received by a sensing device can include signals received directly from one or more of the other sensing devices and/or can include signals reflected off of one or more objects (e.g., people, animals, furniture) and/or structures (e.g., walls, ceilings, columns, etc.) in the environment.

The wireless devices 412 can include user devices (e.g., user device 107 of FIG. 1, such as a mobile device or any other type of device), Internet of Things (IoT) devices, extenders, replicators, any combination thereof, and/or any other wireless device. The access points 410 can operate as radio frequency sensing devices, Wi-Fi sensing enabled access points, and wireless devices utilizing at least one transceiver (or separate transmitter and receiver), as described herein. The access points 410 and the wireless devices 412 can be distributed throughout an environment to provide a distributed range of sensing coverage for the distributed sensing system 400 to use for performing the radio frequency sensing based detection operations noted above. For example, as shown in FIG. 4, the access points 410 are positioned on both floors and ends of dwelling 402, while the wireless devices 412 are positioned only on the second floor. The placement and position of the access points 410 and the wireless devices 412 determine the coverage of the distributed sensing system 400, which can be repositioned to provide optimal sensing coverage as described herein.

The distributed sensing system 400 is illustrated in FIG. 4 as being positioned within the dwelling 402. However, the systems and techniques described herein can be used for any environment, including indoor and outdoor environments (e.g., a commercial building, a military facility, an indoor or outdoor shopping facility, an outdoor park, an outdoor concert venue, etc.). As illustrated in FIG. 4, the distributed sensing system 400 can detect objects, such as an intruder 420. In some implementations, when the intruder 420 enters the dwelling 402, the distributed sensing system 400 can detect an unidentified/unauthorized object (e.g., the intruder 420) and then begin tracking the position of the intruder 420 throughout the dwelling 402. In other implementations, the distributed sensing system 400 can provide an alert (e.g., to authorities such as the police or a home defense company, to a user device of a person associated with the dwelling, etc.) of the detected intruder's 420 presence. Based on the data received from the sensing devices (e.g., access points 410 and/or wireless devices 412), the distributed sensing system 400 can also determine when the object is an intruder, pet, authorized personnel, etc.

In some implementations, the distributed sensing system 400 can detect and characterize changes in an environment by utilizing radio frequency signals such as Wi-Fi signals. In general, radio frequency signals are reflected by objects (e.g., walls, columns, furniture, animals, etc.) and/or people located in the dwelling 402. Data relating to radio frequency reflections includes amplitude and phase change of the radio frequency signals when objects/people move about a given space. The distributed sensing system 400 can be configured to detect motion (e.g., presence of motion or lack of motion or no-motion), motion patterns (e.g., walking, falling, gestures, or other motion), motion location (e.g., a position), motion tracking (e.g., movement of an object or person over time), vital signs of a person or animal (e.g., breathing, heart rate, etc.), any combination thereof, and/or other information. As shown in FIG. 4, the distributed sensing system 400 can provide motion detection and room-level positioning in a dwelling 402.

Algorithms, as described herein, can be utilized by the distributed sensing system 400 to detect motion, location of motion, and types of motion. In some implementations, the distributed sensing system 400 can utilize machine learning (e.g., using a machine learning system such as those described and illustrated in FIGS. 12 and 13) and detection algorithms that can be trained to detect a desired feature such as position, motion, location of motion, or type of motion. The distributed sensing system 400 can be utilized to provide a process for training that includes generating a large number of test data and associating ground truth labels to each data point. In the radio frequency sensing context, the data can be represented by the collected radio frequency channel signatures, and the labels can include location of motion and type of motion, per each data point. Labelling can include either a manual input or a detection system that provides the ground truth (e.g., use of a camera system along with computer vision algorithms).

Referring to FIG. 4, the distributed sensing system 400 can further include providing a wireless device (e.g., mobile device 430) of a user with one or more messages or alerts (e.g., a motion alert 432) including motion detection and motion location information. In FIG. 4, the intruder 420 is detected by the distributed sensing system 400, which can then provide the motion alert 432 to the user's mobile device 430. Such alerts can include an icon representing the alert (e.g., an icon of an intruder) and a brief description of the motion alert 432 (e.g., "Motion detected in the front hall"). The distributed sensing system 400 can further provide sensing coverage output data including information (e.g., indications, instructions, descriptions, etc.) to the wireless device (e.g., the mobile device 430) of the user. The sensing coverage output data can provide information associated with placement and/or addition of sensing devices (e.g., the access points 410 and/or wireless devices 412) to provide the most optimum sensing coverage in a given environment. For example, unlike typical network coverage (e.g., Wi-Fi coverage provided by one or more Wi-FI Access Points) that does not take into account the ability to provide sensing data that can be used for radio frequency sensing based detection operations, the distributed sensing system 400 can receive sensing data (e.g., RSSI/CSI data) from the sensing devices (e.g., access points 410 and/or wireless devices 412) and can determine whether a particular sensing device is at a location that optimizes sensing coverage of the distributed sensing system 400.

In some implementations, the distributed sensing system 400 can utilize RF signals to determine characteristics (e.g., position and movement) of objects detected within the dwelling 402. For example, the RF signals can first be transmitted by a sensing device (e.g., one of the access points 410 and/or wireless devices 412) or one transmitting antenna of a sensing device. The RF signals then can be received at another sensing device (e.g., another one of the access points 410 and/or wireless devices 412) or a receiving antenna of the sensing device depending on the configuration of the distributed sensing system 400. The distributed sensing system 400 can further determine how the environment within the dwelling 402 affects the propagation of the RF signals based on the RSSI data, CSI data, and/or other data received from the sensing devices. The distributed sensing system 400 can also determine detections and interferences based on the propagation of the RF signals experienced by the sensing devices.

The distributed sensing system 400 can include many different applications. The example of FIG. 4 illustrates an example of using the distributed sensing system 400 for detection of objects or people, such as for home security purposes. As shown, the distributed sensing system of FIG. 4 includes multiple sensing devices (e.g., access points 410 and/or wireless devices 412) in the dwelling 402 that are part of a sensor network of the distributed sensing system 400. The sensing devices (e.g., access points 410 and/or wireless devices 412) are configured to provide sensing measurements that can be utilized by the distributed sensing system 400 to detect characteristics of objects, such as the presence of and/or motion of the intruder 420. For instance, the distributed sensing system 400 can detect movement of an object from location to location in the dwelling 402, and specific characteristics of the movement of the object such as speed and direction. The distributed sensing system 400 further collects a large amount of sensing data from the sensing devices, such as RSSI data, CSI data, and/or other data. By utilizing machine learning, the distributed sensing system 400 can analyze object detections based on the collected sensing measurement data (e.g., RSSI/CSI data) from the sensing devices.

FIGS. 5A-5C are diagrams 510, 520, 530 illustrating examples of object detection utilizing a distributed sensing system. FIGS. 5A-5C can further illustrate motion detection and positioning across a building 502. For example, in diagram 510 of FIG. 5A, an object 512 (e.g., a person) is detected by a distributed sensing system (e.g., the distributed sensing system 400 of FIG. 4), as described herein. The object 512 is detected in a hallway 514 of a western portion of the building 502. As shown in diagram 520 of FIG. 5B, as the object 512 moves in an easterly direction, the object 512 enters a room 524 of the building 502. By utilizing sensing devices distributed throughout the building 502, the distributed sensing system can determine where the object 512 is located. Thereafter, as shown in diagram 530 of FIG. 5C, the object 512 moved from the room 524, into the hallway 514, and into another room 534. In the room 534, the distributed sensing system can detect the position of the object 512 in the room 534. For example, the object 512 in diagram 530 of FIG. 5C, the object 512 is detected to be in the south-easterly corner of the room 534.

The sensing devices (e.g., such as access points and/or wireless devices) of the distributed sensing system can also be utilized to receive and collect channel estimation information and data from the sensing devices. In some examples, the distributed sensing system can include synchronized cameras, phone applications, or other devices or applications to receive and collect corresponding labels of the detected objects. As discussed herein, the distributed sensing system can utilize the large amount of sensing data and associated ground truth labels for each corresponding data point. For example, in the radio frequency sensing context, the sensing data can be represented by the collected radio frequency channel signatures, and the labels can include location of motion and type of motion, per each data point. Labelling can include either a manual input or a detection system that provides a ground truth that can be used along with a loss function to train a machine learning system to perform one or more radio frequency sensing based detection operations (e.g., to detect the position and/or motion of a target object, etc.). In some cases, camera systems can include automatic detection and mapping of object position.

Figure 6:
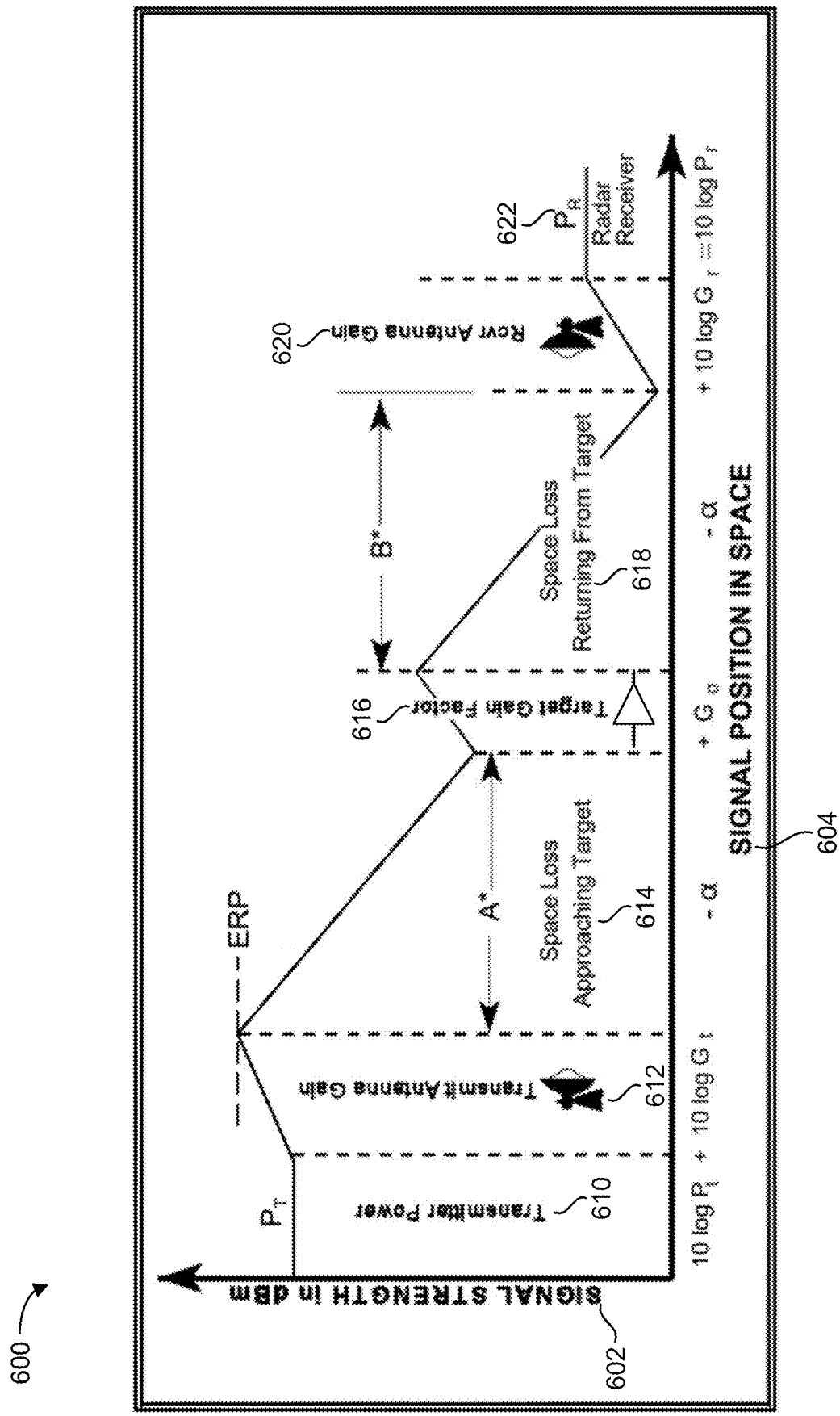
FIG. 6 is a diagram illustrating an example graph of signal strength versus signal position in space, in accordance with some examples.

In some implementations, to detect an event in an environment by the distributed sensing system, there may need to be a strong enough signal so that the reflected signal can reach the receiver of a sensing device of the distributed sensing system. As illustrated in FIG. 6, the strength of the signal can depend on at least the transmit power of the sensing device, the antenna gains of the sensing device, and the distance between the transmitter, the target, and the receiver. For example, the greater the transmit power, the more likely the reflected signal will reach the receiver of the corresponding sensing device. If the transmit power is too low, the reflected RF signal may be too low to be detected by the receiver of the sensing device. Similarly, if antenna gains are too low, the receiver may not sufficiently receive the reflected RF signal. Distance also affects the quality of transmitted signals and reflected signals. For example, the greater the distance between two sensing devices (e.g., pathloss) or the transmitter and receiver of the same sensing device, depending of the configuration of the distributed sensing system, the lower the signal strength will be for the RF signal and the reflected RF signal. Path loss (e.g., space loss 614, 618 of FIG. 6), or path attenuation, is the reduction in power density of an electromagnetic wave as the signal propagates through space. The strength of the signal can also depend on the type of target. For example, if a target is small in size (e.g., 1 inch in diameter, 3 inches in diameter, 6 inches in diameter, etc.), the surface area of the target may be small and thus only a small amount of RF signals may reflect off of the target. If the target is large in size, the target will have a large surface area that reflects a large amount of RF signals. Reflectivity of a target can be referred to as a radar cross section. The distributed sensing system can measure the strength of signals reflected from different objects. Based on the signals, reflected signals, and the strength of the signals, the distributed sensing system can predict aspects of the target, such as location and movement of the target. However, if the target is far from the sensing devices, the signals received by the distributed sensing system may be too weak to detect a location of the target or other aspect of the target. If the target is closer to the sensing devices, the signals reflected by the target may have enough signal strength for the distributed sensing system to make accurate detections.

FIG. 6 is a diagram illustrating an example graph 600 of signal strength 602 versus signal position in space 604 with respect to detecting an object. In some implementations, a distributed sensing system (e.g., the distributed sensing system 400 of FIG. 4) can detect events in an environment that can be represented as a function of signal strength (e.g., of radio frequency signals) received by a sensing device. The radio frequency signals can be generated as reflected radio frequency signals by a target sensing device. In some implementations, the signal strength of the radio frequency signals can be based on: transmission power; antenna gains; pathloss between a transmitter and a reflector, as a function of sensing devices and a target location; pathloss between the reflector and the receiver, as a function of the sensing devices and the target location; reflectivity of the target (e.g., radar cross section (RCS)); receiver specifications; any combination thereof; and/or other factors. In some cases, RCS can be determined as a function of the target size and/or shape. In some cases, antenna gains can be approximated by the distributed sensing system. The distributed sensing system can predict a received sensing signal caused by a target at a given location, such as based on received signal strength indicators (RSSIs), pathloss measurements, and/or other factors.

Referring to FIG. 6, the graph 600 illustrates transmitter power ($P_T$) 610, transmit antenna gain ($G_t$) 612, space loss 614 approaching target ($\alpha$), target gain factor ($G_\sigma$) 616, space loss 618 returning from target ($\alpha$), receiver antenna gain ($G_r$) 620, and receiver power ($P_r$) 622. The distributed sensing system can further determine effective radiated power (ERP). For example, if power is measured in region A (e.g., the space loss approaching target 614) or region B (e.g., the space loss 618 returning from target), the power can be stated in either power density (mW/cm$^2$) or field intensity (V/m).

Signal strength versus signal position in space of FIG. 6 can be defined by the following equation: 10 log $P_t$+10 log $G_t$−$\alpha$+$G_\sigma$−$\alpha$+10 log $G_r$=10 log $P_r$.

Figure 7:
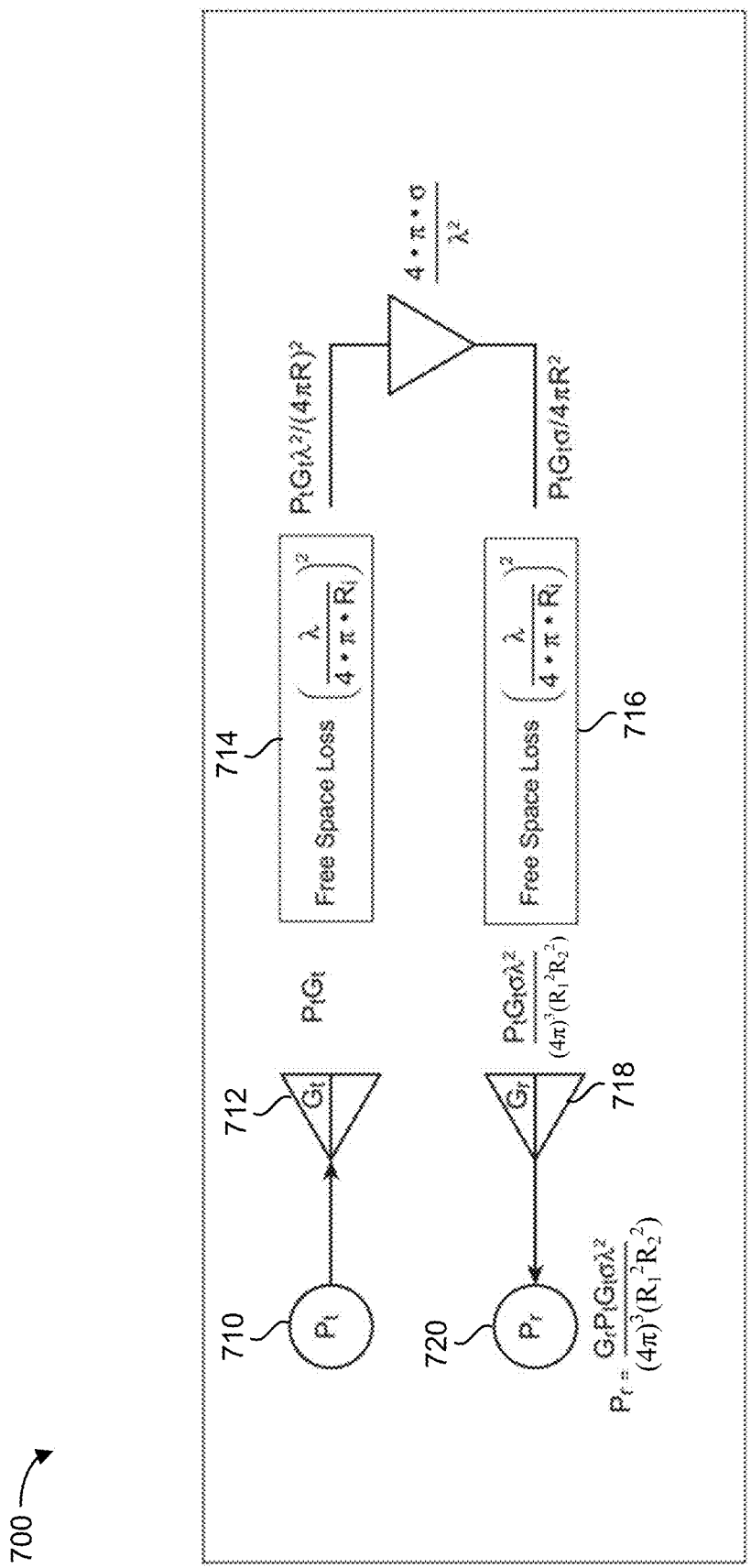
FIG. 7 is a diagram illustrating an example block diagram for radar cross section measurements, in accordance with some examples.

FIG. 7 is a diagram illustrating an example block diagram for radar cross section measurements 700. For example, radar cross section measurements can include transmitter power ($P_T$) 710, transmit antenna gain ($G_t$) 712, free space loss 714, 716

$$\left(\left(\frac{\lambda}{4\cdot\pi\cdot R_i}\right)^2\right),$$

receiver antenna gain ($G_r$) 718, and receiver power ($P_r$) 720

$$\left(e.g., P_r = \frac{G_r P_t G_t \sigma \lambda^2}{(4\pi)^3 (R1^2 R2^2)}\right).$$

The radar cross section measurements 700 can further utilize the following equations: $P_t G_t \lambda^2/(4\pi R)^2$, $(4\cdot\pi\cdot\sigma)/\lambda^2$, $P_t G_t \lambda^2/4\pi R^2$, and $P_t G_t \sigma \lambda^2/(4\pi)^3(R_1^2 R_2^2)$. $\lambda$ refers to a wavelength of a radio frequency signal. $R_i$ refers to a distance from a transmitter or receiver to a target. For instance, $R_1$ refers to a distance between a transmitter and a target, and $R_2$ refers to a distance between a target and a receiver. $\sigma$ refers to a radar cross section (RCS). Power and wavelengths of the radio frequency signals can also be adjusted by the distributed sensing system to optimize quality and range of the radio frequency signals.

Figure 8:
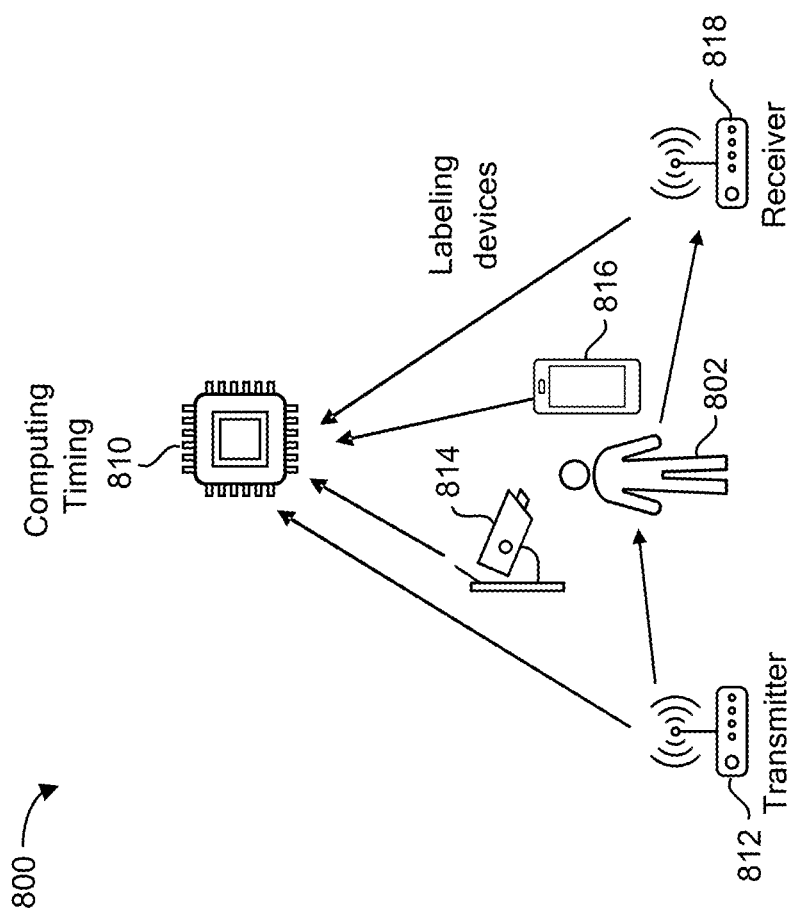
FIG. 8 is a diagram illustrating an example of a distributed sensing system, in accordance with some examples.

FIG. 8 is a diagram illustrating an example of a distributed sensing system 800 that can be configured to perform object detection and labeling, according to some aspects of the present disclosure. In some aspects, the distributed sensing system 800 can include a computing device 810, labeling devices such as cameras 814 and mobile devices 816, and various sensing devices 812 and 818 (which in some cases can provide labels). The sensing devices 812 and 818 can include transmitters and/or receivers (e.g., transceivers) and can include access points, wireless devices (e.g., mobile phones, etc.), and/or other devices. It is understood that the distributed sensing system 800 may utilize a various number of other computing devices, labeling devices, and/or sensing devices to perform object detection/sensing operations, without departing from the scope of the disclosed technology.

In some aspects, the computing device 810 can include a central processing unit (CPU) and/or a graphics processing unit (GPU) for training machine learning models and executing object detection algorithms as described herein. In some aspects, the computing device 810 of the distributed sensing system 800 can further be integrated into a wireless device such as one or more of sensing devices 812, 818 and/or the labeling devices (e.g., camera 814, mobile device 816, etc.). As such, processing functions performed by computing device 810 can be performed utilizing hardware of a discreet device, or may be performed in a distributed manner, e.g., by utilizing hardware resources and/or functionality of multiple disparate devices.

In some implementations, the distributed sensing system 800 can include synchronization services that can ensure synchronization (e.g., time synchronization such as a Network Time Protocol) between received RF signals (e.g., from the sensing devices 812, 818) and received training labels (e.g., from the labeling devices such as the camera 814, mobile device 816, etc. and/or from the sensing devices 812, 818). The distributed sensing system 800 can further include communication services that exchange information across the sensing devices 812, 818 and the labeling devices via wireless (e.g., Wi-Fi, Bluetooth, etc.) or wired (e.g., Ethernet) communication channels. The distributed sensing system 800, and the sensing devices 812, 818, and the labeling devices (e.g., camera 814, mobile device 816, etc.) of the distributed sensing system 800 can include a graphical user interface to display results based on received RF signals (e.g., from the sensing devices 812, 818) and labels (e.g., from the labeling devices and/or from the sensing devices 812, 818) such as an inference label that can indicate a location or action of an associated object by utilizing a machine-learning model as described herein.

In some aspects, the sensing devices 812, 818 of the distributed sensing system 800 can be configured to transmit and receive RF signals and waveforms that can be utilized by the distributed sensing system 800 to identify characteristics of various objects in the vicinity of the sensing devices 812, 818. Detectable objects can include any physical body that is capable of reflecting RF signals or waveforms, including but not limited to: inanimate objects, such as walls, floors, vehicles, or furniture, etc., and/or animate objects such as people (e.g., person 802), and/or pets, and the like. In some examples, sensing system 800 can be configured to determine object location and/or position characteristics, such as object location, orientation, or pose. In some examples, sensing system 800 can be configured to determine actions associated with an object, such as motion profiles or movement characteristics.

To perform sensing operations, distributed sensing system 800 can be configured to generate and/or train a sensing model using received radio frequency data and label data as described herein (e.g., from the labeling devices and/or the sensing devices 812, 818). Additionally, distributed sensing system 800 can be configured to utilize the sensing model to generate inferences regarding the position and/or motion characteristics of sensed objects, such as person 802, based on the radio frequency data and the label data.

In some aspects, the training and generation of a sensing model can be performed using a combination of data that is detected and/or received by the distributed sensing system 800. For example, the distributed sensing system 800 can be configured to generate and/or train a sensing model, e.g., a machine-learning model that is configured to generate labeling inferences when presented with RF data based on RF signals reflected from one or more various objects. In some aspects, training and/or generation of the sensing model can be based on RF data received from one or more wireless devices (e.g., the sensing devices 812, 818), and corresponding training label data received from the labeling devices (e.g., camera 814, mobile device 816, etc.) and/or from sensing devices 812, 818, for example, that includes descriptions (e.g., of position, location, or motion, and the like) for one or more objects in the vicinity of the sensing devices 812, 818 and/or the labeling devices.

By way of example, a transmitter of the sensing device 812 can transmit RF signals/waveforms within a given vicinity, which can then be reflected off of one or more animate or inanimate objects, such as person 802 in the same vicinity. The reflected waveforms can then be received by a receiver of the sensing device 818, which can communicate the radio frequency data (e.g., RSSI/CSI data) to the computing device 810 of the distributed sensing system 800. The radio frequency data (e.g., waveform measurement data) can correspond with various characteristics of the reflecting object. For example, the waveform measurement data can be based on a location of the person 802, a size of the person 802, and/or a distance of the person 802 from the sensing device 812, sensing device 818, and/or other devices.

Concurrently, training label data can be provided to computing device 810 from various wired and/or wireless devices of the distributed sensing system 800. For example, training label data can include data collected by the labeling devices (e.g., camera, video, position, accelerometer, etc.) and/or sensing devices 812, 818, as well as data that is user provided, e.g., text strings (such as selected text), audio, etc., via a wireless device such as a mobile device. In some implementations, the label data can include location data such as a location indication. The location indication can be specified in terms of an area of the environment (e.g., a room) or in terms of coordinates relative to a reference system defined for the environment of interest. Such labelling data can represent the "ground truth" for the position of the target to be detected. For example, the target of detection can include locating a person within the environment. The associated labels can represent the ground truth position of the person. In such an example, the person can carry the device that can be configured to generate the labels so that the position measured by the device, or inputted by the person via the device, is representative of the position of the person.

In some implementations, the labeling devices (e.g., camera 814, mobile device 816, etc.) and/or the sensing devices 812, 818 can generate labels (e.g., training label data) that can be associated with the received RF data (e.g., represented as channel condition information). By way of example, the cameras 814 and input devices such as the mobile device 816 can provide the distributed sensing system 800 with training label data. In some aspects, a user can carry a mobile device, which can be used to generate labels associated with a characteristic of the user. The mobile device 816 can include sensors (e.g., GPS units) to determine the position of the mobile device 816, and hence of the user. For example, the mobile device 816 and access points can utilize Wi-Fi round trip time (RTT) (e.g., distance measurements for positioning purposes) to determine the location of the mobile device 816 within a building. In some aspects, the labeling devices (e.g., camera 814, mobile device 816, etc.) can be synchronized with the sensing devices 812, 818 of the distributed sensing system 800 so that the training labels provided by the labeling devices can be synchronized with the collected RF signal data. The training labels and the RF signal data can then be utilized for training purposes by the distributed sensing system 800.

In some examples, labeling devices, such as mobile device 816, and/or the sensing devices 812, 818 can receive training label data that is provided as an input, for example, by a user. In such examples, training label data can include text inputs (e.g., that are provided via a device keyboard, such as an on-screen keyboard), and/or as audio-inputs, for example, that are provided as spoken words detected by a microphone of the mobile device 816. In some aspects, text inputs can include one or more text strings, that describes or indicates, object location, object type, motion information, such as, whether motion is occurring, which action is being performed (e.g., running or jumping), and/or a location in which the motion is occurring. In some aspects, the training label data, including provided text string data, can include information identifying one or more people or animate objects, such as by providing information about the identity of the person 802. By way of further example, information identifying an individual can include biometric data or other biometric identifiers, such as fingerprints, facial patterns, voice recognition data, etc. By way of example, biometric data may include physical or behavioral characteristics that can be used in facilitating an identity validation process, for example, that is necessary to grant access to systems, devices, or data.

In some aspects, the distributed sensing system 800 can utilize one or more cameras, such as a camera 814, to generate training label data, for example, that includes information that helps to identify various object characteristics, such as object type, object size, object location, and/or behavioral characteristics (motion) associated with the object (e.g., person 802). In some aspects, the cameras 814 (e.g., pre-installed or deployed) of the distributed sensing system 800 can be utilized to identify events of interest (e.g., object motion, proximity, and location). By way of example, using image processing techniques, images and or video feeds recorded by cameras 814 may be used to parse image data to identify events or behaviors that can be provided as training label data.

In some aspects, various labeling devices and/or sensing devices 812, 818 may be operated together to generate and/or edit labeling data. For example, cameras 814 may be operated in conjunction with one or more other labeling devices, such as, the mobile device 816, to enable the person 802 to enter or edit training labels for events of interest, such as determining the position of the detected object as the person 802 physically moves between different locations (e.g., rooms) around a floor plan of a building.

In some aspects, one or more devices in distributed sensing system 800 can utilize positioning systems such as GPS and Wi-Fi positioning devices (not illustrated) to determine more accurate locations of the detected objects, the computing device 810, the sensing devices 812, 818, the camera 814, and/or the mobile devices 816 of the distributed sensing system 800.

In some aspects, the distributed sensing system 800 can be configured to train and/or update a sensing model based on the received training label data and/or radio frequency data. The training and generation of a sensing model can be performed using combinations of data detected and/or received by the distributed sensing system 800. For example, the distributed sensing system 800 can be configured to generate and/or train a sensing model such as a machine-learning model that can be configured to generate labeling inferences when presented with RF data based on RF signals reflected from one or more various objects. By way of example, training label data can be used to perform supervised-learning using a machine-learning model configured to receive RF data as an input, and to provide one or more labels based on the RF data, as an output.

In some aspects, the training and/or generation of the sensing model can be based on RF data received from one or more wireless devices (e.g., the sensing devices 812, 818), and corresponding training label data received from the labeling devices (e.g., camera 814, mobile device 816, or other labeling device) and/or sensing devices (e.g., sensing devices 812, 818). The training label data can include descriptions (e.g., of position, location, or motion, and the like) for one or more objects in the vicinity of the wireless devices 812, 814, 816, 818. In some examples, the distributed sensing system 800 can provide indications as to whether the training process (e.g., of a machine learning, sensing model) is sufficient or whether more training labels need to be collected from certain locations in the environment. By way of example, indications of training sufficiency or completeness may be provided to a user associated the mobile device 816, for example, via an on-screen display, audible notification, or the like.

In some examples, the distributed sensing system 800 can include deployment procedures, for example, to facilitate sensing device 812, 818 placement. By way of example, the sensing system 800 can be operated to make recommendations regarding the placement of sensing devices 812, 818, within an environment in which object sensing is to be performed.

Once trained, the sensing model can be configured to provide labeling inferences for novel or subsequent RF data inputs, for example, that are representative of various object characteristics, e.g., object type, object size, location, origination (or pose), and/or object motion profile. In some approaches, the sensing model may be (or may include) a deep-learning network, such as a convolutional neural network described with respect to FIGS. 11, and 12, as provided below.

Figure 9:
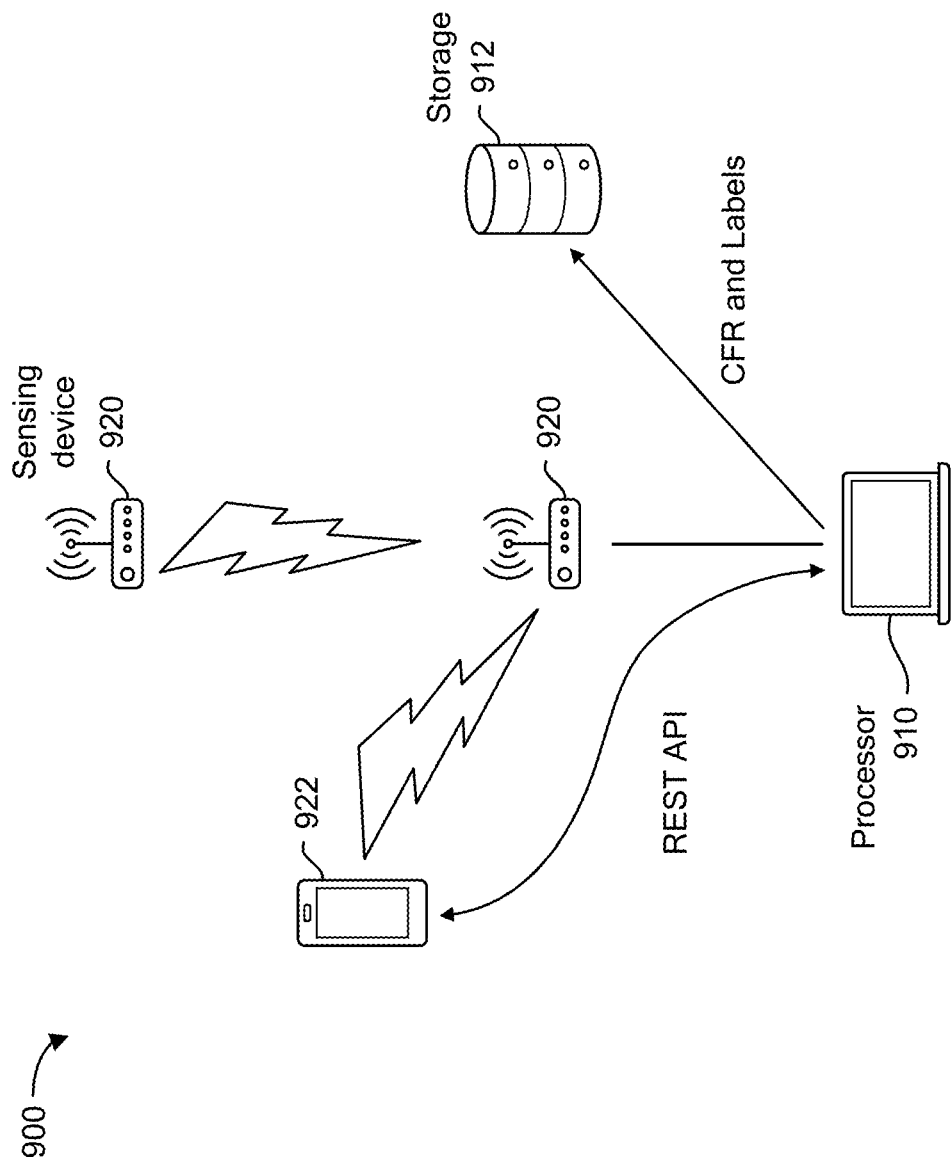
FIG. 9 is a diagram illustrating an example of labeling procedure, in accordance with some examples.

FIG. 9 is a diagram illustrating an example of a labeling procedure that can be performed by a distributed sensing system 900. In some aspects, the distributed sensing system 900 can include a processor 910 (e.g., a network time protocol (NTP) server that can synchronize the time of the devices 912, 920, 922 of the distributed sensing system 900), a storage device 912, sensing devices 920 (e.g., access points and wireless devices), and labeling devices 922 (e.g., mobile devices and cameras). In some aspects, the labeling devices 922 can communicate with the processor 910 by a representational state transfer ("REST") application programming interface (API).

In some implementations, the distributed sensing system 900 can be configured to store labels (e.g., training labels received from the labeling devices, such as the camera 814 and/or the mobile device 816 of FIG. 8 and/or the sensing devices 812, 818) in the storage device 912 and/or provide the labels in real time to the processor 910 for machine learning model training. In some aspects, the training labels received from the labeling devices 922 can be timestamped according to a common timer utilized by the labeling devices 922 and RF sensing devices 920 (e.g., the sensing devices 812, 818 of FIG. 8). The processor 910 can be part of a server (e.g., a network time protocol (NTP) server or other type of server) of the distributed sensing system 900, which in some cases can be utilized to synchronize the time of the sensing devices 920 and the labeling devices 922. For example, the server (e.g., using the process 910) can time synchronize the RF sensing signals and sensing measurements of the sensing devices 920 with the training labels captured by the labeling devices 922. The training labels and sensing signals and/or measurements can be used to train a machine learning model to perform radio frequency sensing detection operations (e.g., detecting motion or no motion, detecting motion patterns, detecting positions of objects or people, motion tracking, detecting vital signs of a person or animal, and/or other operations).

In some examples, after deployment of the initial set-up operation of the distributed sensing system 900 and during normal operation of the distributed sensing system 900, the distributed sensing system 900 can output data (e.g., one or more inference labels) that include or describe characteristics associated with the detected object. For example, inference label outputs of the distributed sensing system 900 can include one or more text strings, audible notifications, graphics, and/or pictures describing the position/location and/or actions of the detected object.

Figure 10:
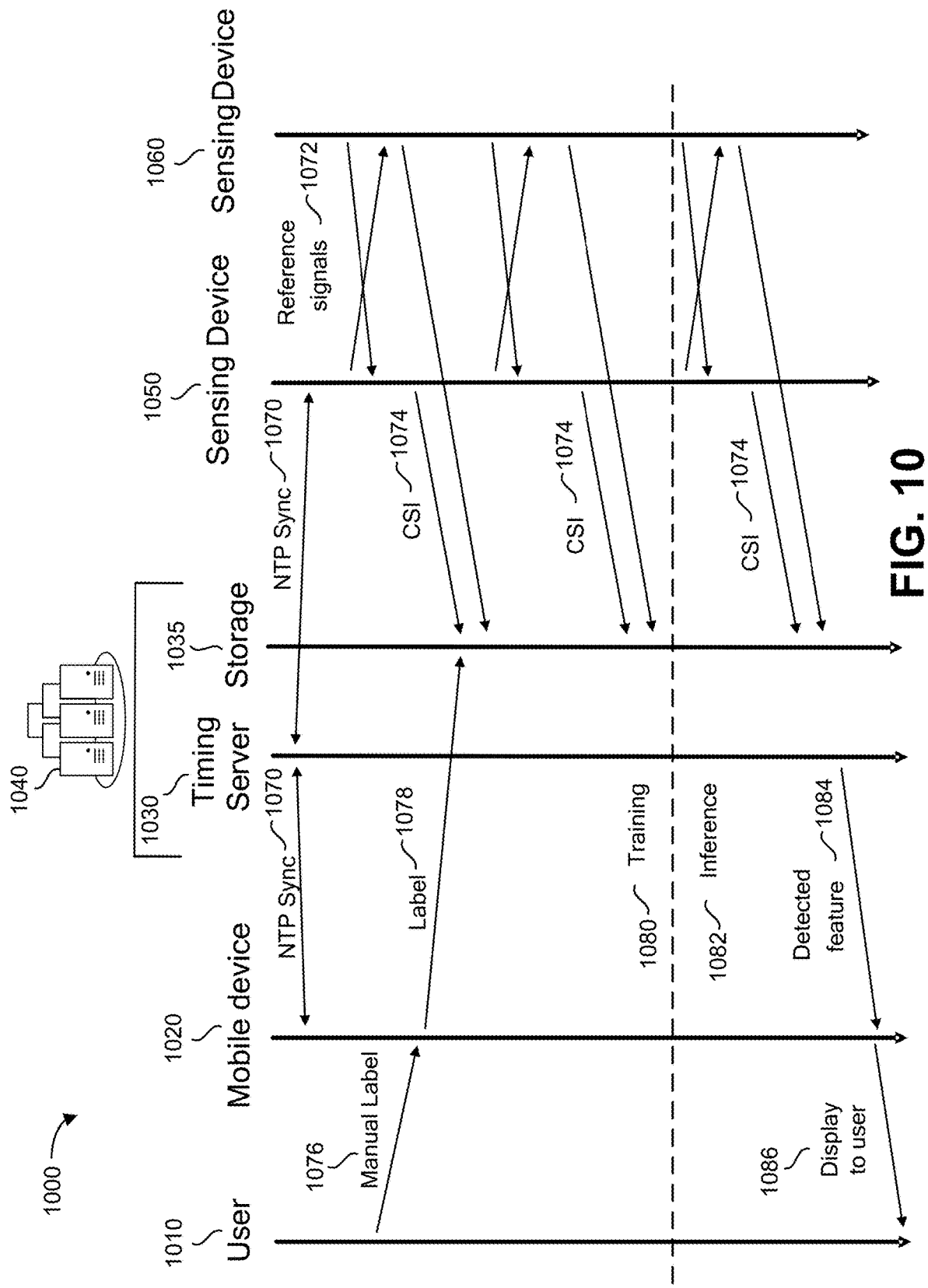
FIG. 10 is a diagram illustrating an example labeling operation performed by a distributed sensing system, in accordance with some examples.

FIG. 10 is a diagram illustrating an example labeling operation performed by a distributed sensing system 1000, according to some aspects of the disclosed technology. In some aspects, the distributed sensing system 1000 can include a mobile device 1020, a timing server 1030, a storage device 1035, and sensing devices 1050, 1060. Depending on the desired implementation, functions performed by the timing server 1030 and the storage device 1035 may be performed on separate devices. Alternatively, one or more of the functions performed by the timing server 1030 and the storage device 1035 may be performed on a common device, such as server 1040.

As described herein, an NTP server or timer (e.g., the timing server 1030) can be utilized by the distributed sensing system 1000 to synchronize various devices, such as one or more labeling deices (e.g., the mobile device 1020) and one or more sensing devices 1050, 1060. In some approaches, time synchronization can be utilized to correlate received RF data with training label data, for example, to facilitate the training and/or updating of a sensing model, e.g., a machine-learning model, as discussed above.

In some implementations, the sensing devices 1050, 1060 of the distributed sensing system 1000 can transmit RF signals and waveforms, and receive reflected RF signals and waveforms (e.g., reference signals 1072), necessary to perform object detection. The resulting RF data, which can be based on the RF signals and/or waveforms reflected from one or more objects (not illustrated), can then be provided as RF data, e.g., to the storage device 1035. In some examples, the sensing devices 1050, 1060 of the distributed sensing system 1000 can transmit the RF frequency data as Channel State Information (CSI data 1074) to the storage device 1035. In some aspects, the RF sensing data measured by the sensing devices 1050, 1060 (CSI data 1074) can include information relating to direct paths (e.g., a leakage signal) of a transmission waveform (e.g., sensing signal) together with data relating to reflected paths (e.g., a reflected waveform/sensing signal) that correspond to the transmission waveform.

As illustrated in the example of FIG. 10, the storage device 1035 can also be configured to receive training labels (e.g., labels 1078) that correspond with the RF data (e.g., CSI 1074) that is received by the storage device 1035. Depending on the desired implementation CSI data 1074 and/or labels 1078 may be received concurrently, for example, in real-time or near real time. In some aspects, the CSI data 1074 and/or the labels 1078 may be locally stored for an indefinite period of time on an associated device, such as one or more of sensing devices 1050, 106, or mobile device 1020, respectively. In some aspects, a time-sync function provided by timing server 1030 can be used to ensure that labels 1078 are correctly correlated with their corresponding CSI data. By way of example, a Network Time Protocol (NTP) time-sync function (e.g., an NTP sync 1070) can be used to ensure a time sync between the mobile device 1020, and the sensing devices 1050, 1060.

As described herein, the labels 1078 can be based on a variety of data that is received and/or captured by one or more labeling devices, such as mobile device 1020, and/or sensing devices. By way of example, labels 1078 can be based on one or more data inputs provided by the user 1010, such as text-based inputs, and/or audible inputs that are provided as manual labels 1076. As discussed above with respect to FIG. 8, manual labels 1076 can be used to provide information regarding object characteristics, such as information indicating an object size, location, orientation, and/or motion, or a combination thereof. In some aspects, the labels 1078 can include data that is automatically captured by a labeling device, such as mobile device 1020, and/or by a sensing device. By way of example, labels 1078 may contain location and/or orientation information associated with mobile device 1020.

By way of further example, the labels 1076 can include various other types of manually entered or manually captured information, such as pictures of the detected object, or text inputs that describe a situational context, such as "entering the kitchen." In such examples, the manual labels 1076 can be entered into or captured by a wireless device (e.g., mobile device 1020) that is associated with the user 1010, and can then be provided to the storage device 1035 of the distributed sensing system 1000.

In some examples, the distributed sensing system 1000 can include various other labeling devices, such as one or more cameras and/or camera systems that are configured to provide labeling services to perform object detection and labeling. For example, the distributed sensing system 1000 can include one or more static cameras (not illustrated) that can be configured to capture images (e.g., pictures or video) of a location of interest in an environment such as a home or company building. The static camera system of the distributed sensing system 1000 can then utilize algorithms described herein (e.g., such as those illustrated in FIGS. 6 and 7) to detect objects, persons, and/or activities of interest (e.g., movement by the objects) and generate corresponding training labels for the detected objects and activities of interest to be used in the training and/or generation of a sensing model as described herein. In some aspects, the static camera system can timestamp the generated labels and provide the labels to the distributed sensing system 1000 to perform object detection and labeling as described herein.

In some implementations, the distributed sensing system 1000 can utilize a camera of the mobile device 1020 to perform visual captures (e.g., capturing pictures and video), inertial odometry, and/or simultaneous location and mapping (SLAM) to determine a position of the mobile device 1020 to perform object detection and labeling as described herein. The determined position of the mobile device 1020 can also be utilized as a label to perform object detection and labeling by the distributed sensing system 1000. The distributed sensing system 1000 can further utilize visual simultaneous localization and mapping (VSLAM), which is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In some examples, the distributed sensing system 1000 can synchronize the collected training labels received from the labeling devices 1020 (and/or sensing devices 1050, 1060) and the RF sensing measurement data received from the sensing devices 1050, 1060, simultaneously. For example, the training labels (e.g., received by the labeling devices 1020) can be received in real time by a processor (e.g., the computing device 810 of FIG. 8 and the processor 910 of FIG. 9) of the distributed sensing system 1000.

In some aspects, the captured training labels can be stored in a storage device of the labeling device 1020 and/or sensing devices 1050, 1060, along with corresponding time stamps (e.g., time stamps provided by a Wi-Fi Timing Synchronization Function (TSF) timer) that allow the labeling device 1020 (and/or and/or sensing devices 1050, 1060) and the distributed sensing system 1000 to correlate the RF sensing measured data with the corresponding training label to perform object detection and labeling as described herein. In some examples, the NTP sync 1070 of the distributed sensing system 1000 can further be utilized to synchronize the captured training labels from the labeling devices 1020 with the RF sensing signals and measurements captured and determined by the sensing devices 1050, 1060 to perform object detection and labeling as described herein.

In some examples, the distributed sensing system 1000 can be configured to perform a training procedure 1080, for example, using the training label data (e.g., manual labels 1076, and labels 1078) and the RF data, such as the data that is received by storage device 1035 as channel state information (CSI) data 1074. As described herein, the training procedures 1080 can include training and/or generation of a sensing model (such as a machine-learning model) that is based on the RF data received from one or more wireless devices (e.g., the sensing devices 1050, 1060), and corresponding training label data received from a labeling device, such as, the mobile device 1020 associated with the user 1010.

By way of example, during a deployment training phase of the distributed sensing system 1000, the user 1010 can utilize a wireless device (e.g., a sensing measuring device or a labeling device) or the mobile device 1020 and walk across various rooms and map and label an entire floorplan to perform object detection and labeling. In some aspects, the wireless device associated with the user 1010 can be configured to transmit and receive RF sensing signals, determine RF sensing measurements based on the RF sensing signals (e.g., RSSI/CSI data), and provide the RF sensing measurements and training labels to the distributed sensing system 1000 to perform object detection and labeling as described herein.

As a result of the training procedure 1080, the distributed sensing system can generate a (trained) sensing model, for example, that is configured to receive RF data inputs (e.g., as CSI 1074), and to make inferences 1082 about corresponding object characteristics, such as location, size, or motion, etc. The inferred characteristics can be represented as object labels, for example, that identify particular object features 1084 or other salient information that may be of interest to the user 1010.

In some examples, the distributed sensing system 1000 can be configured to provide automated labeling of Wi-Fi positioning of detected objects to perform object detection and labeling. For example, the wireless device associated with the user 1010 or the mobile device 1020 can be configured to transmit and receive RF sensing signals. In other aspects, the RF sensing signals can be received by the distributed sensing system 1000 from a different RF distributed sensing system and utilized for generating automatic labels for the learning algorithm (e.g., 802.11/WFA "Wi-Fi Location" and Bluetooth). In some aspects, the RF sensing signals utilized by the distributed sensing system 1000 can include GPS data that can include positional data of a detected object.

In some implementations, the distributed sensing system 1000 can be configured to output a representative label (e.g., an inference label) based on the training and/or generation of the sensing model as described herein. For example, the representative label can be based on RF data received from one or more wireless devices (e.g., the sensing devices) and corresponding training label data received from the labeling devices (and/or sensing devices) to perform object detection and labeling. In some aspects, a picture or video corresponding to the detected object's motion, location, or action can be provided to the wireless device associated with the user 1010, which can be displayed 1086 on the wireless device to present the representative labels to the user 1010. In one example, if the representative label includes a detected motion that occurred in the kitchen, the distributed sensing system 1000 can output a picture of the kitchen that was taken during the deployment training process of the distributed sensing system 1000 when the user 1010 was in the kitchen and initially captured the picture with a labeling device (e.g., the mobile device 1020 of the wireless device associated with the user 1010). In some aspects, the distributed sensing system 1000 can further output a text label associated with the corresponding location of the text label and a sound label associated with the corresponding location of the sound label.

In some examples, inferring a location by the distributed sensing system 1000 can include running an action classifier on an RF sensing signal (e.g., a Wi-Fi sensing signal) and determining a corresponding location of a detected object (e.g., a person) based on the action detected to perform object detection and labeling. For example, the action classifier can be pretrained and associated with a dataset of actions (e.g., a "typing" motion can identify the location as being an office and a "cooking" motion can identify the location as being a kitchen). The advantage is that manual user input during the deployment training process of the distributed sensing system 1000 is minimized as there is no need to define a pre-set list of labels and provide corresponding descriptions to each label.

Figure 11:
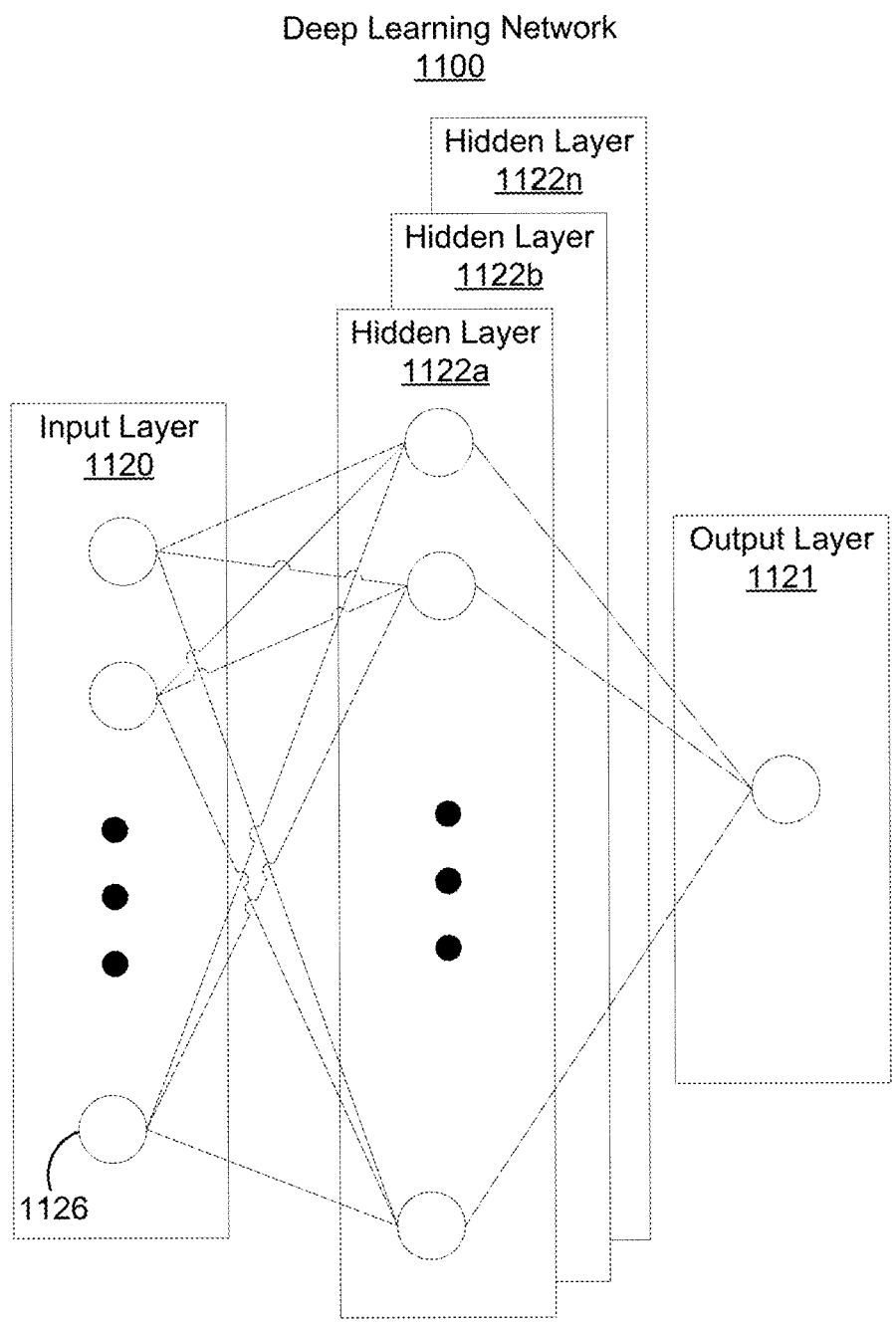
FIG. 11 is a block diagram illustrating an example of a deep learning neural network, in accordance with some examples.

FIG. 11 is an illustrative example of a deep learning neural network 1100 that can be used to implement the distributed sensing system described above. An input layer 1120 includes input data. In one illustrative example, the input layer 1120 can include data representing the pixels of an input video frame. The neural network 1100 includes multiple hidden layers 1122a, 1122b, through 1122n. The hidden layers 1122a, 1122b, through 1122n include "n" number of hidden layers, where "n" is an integer greater than or equal to one. The number of hidden layers can be made to include as many layers as needed for the given application. The neural network 1100 further includes an output layer 1121 that provides an output resulting from the processing performed by the hidden layers 1122a, 1122b, through 1122n. In one illustrative example, the output layer 1121 can provide a classification for an object in an input video frame. The classification can include a class identifying the type of activity (e.g., playing soccer, playing piano, listening to piano, playing guitar, etc.).

The neural network 1100 is a multi-layer neural network of interconnected nodes. Each node can represent a piece of information. Information associated with the nodes is shared among the different layers and each layer retains information as information is processed. In some cases, the neural network 1100 can include a feed-forward network, in which case there are no feedback connections where outputs of the network are fed back into itself. In some cases, the neural network 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122a. For example, as shown, each of the input nodes of the input layer 1120 is connected to each of the nodes of the first hidden layer 1122a. The nodes of the first hidden layer 1122a can transform the information of each input node by applying activation functions to the input node information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1121, at which an output is provided. In some cases, while nodes (e.g., node 1126) in the neural network 1100 are shown as having multiple output lines, a node has a single output and all lines shown as being output from a node represent the same output value.

In some cases, each node or interconnection between nodes can have a weight that is a set of parameters derived from the training of the neural network 1100. Once the neural network 1100 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1100 to be adaptive to inputs and able to learn as more and more data is processed.

The neural network 1100 is pre-trained to process the features from the data in the input layer 1120 using the different hidden layers 1122a, 1122b, through 1122n in order to provide the output through the output layer 1121. In an example in which the neural network 1100 is used to identify activities being performed by a driver in frames, the neural network 1100 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1100 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1100 is trained well enough so that the weights of the layers are accurately tuned.

For the example of classifying objects in frames, the forward pass can include passing a training frame through the neural network 1100. The weights are initially randomized before the neural network 1100 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (e.g., red, green, and blue, or luma and two chroma components, or the like).

As noted above, for a first training iteration for the neural network 1100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1100 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the first training images since the actual values will be much different than the predicted output. The goal of training is to minimize the amount of loss so that the predicted output is the same as the training label. The neural network 1100 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as w=w_i−ηdL/dW, where w denotes a weight, wi denotes the initial weight, and η denotes a learning rate. The learning rate can be set to any suitable value, with a high learning rate including larger weight updates and a lower value indicating smaller weight updates.

The neural network 1100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1100 can include any other deep network other than a CNN, such as an autoencoder, a deep belief nets (DBNs), a Recurrent Neural Networks (RNNs), among others.

Figure 12:
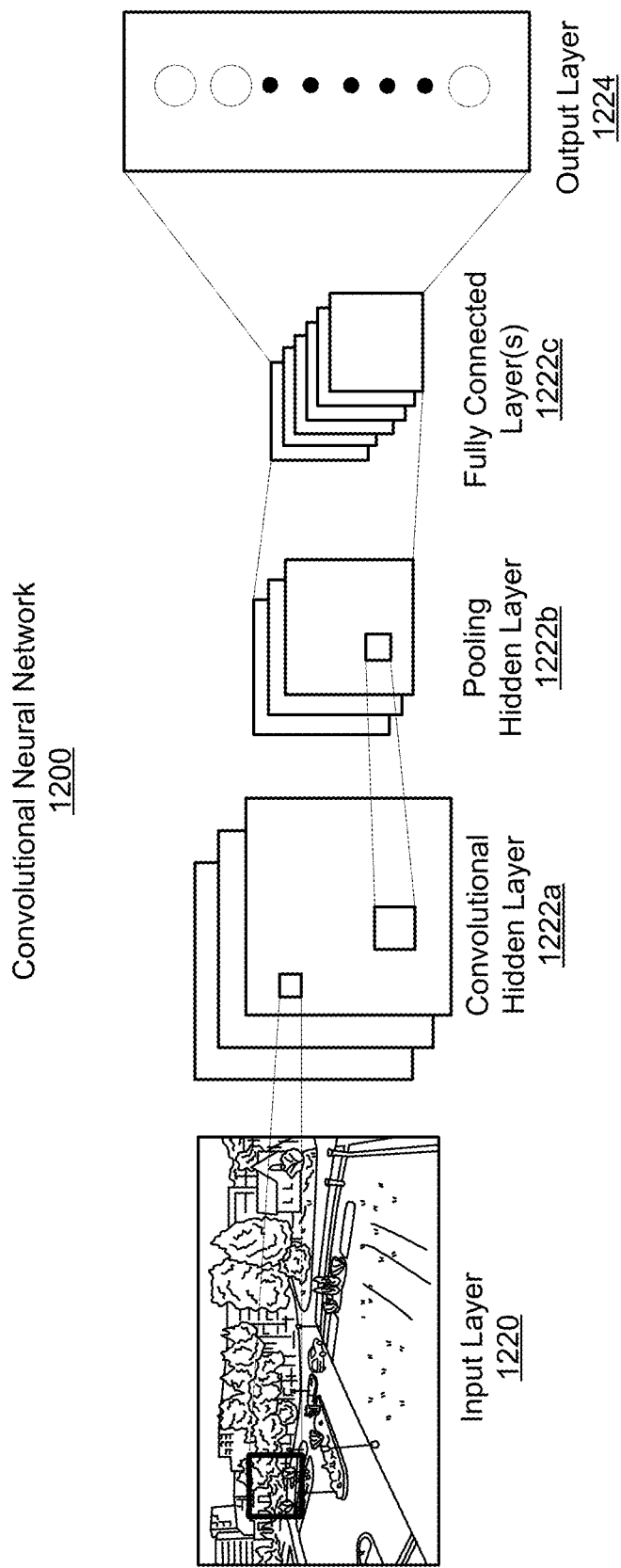
FIG. 12 is a block diagram illustrating an example of a convolutional neural network (CNN), in accordance with some examples.

FIG. 12 is an illustrative example of a convolutional neural network (CNN) 1200. The input layer 1220 of the CNN 1200 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1222a, an optional non-linear activation layer, a pooling hidden layer 1222b, and fully connected hidden layers 1222c to get an output at the output layer 1224. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image.

The first layer of the CNN 1200 is the convolutional hidden layer 1222a. The convolutional hidden layer 1222a analyzes the image data of the input layer 1220. Each node of the convolutional hidden layer 1222a is connected to a region of nodes (pixels) of the input image called a receptive field. The convolutional hidden layer 1222a can be considered as one or more filters (each filter corresponding to a different activation or feature map), with each convolutional iteration of a filter being a node or neuron of the convolutional hidden layer 1222a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1222a. Each connection between a node and a receptive field for that node learns a weight and, in some cases, an overall bias such that each node learns to analyze its particular local receptive field in the input image. Each node of the hidden layer 1222a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1222a is due to each node of the convolutional layer being applied to its corresponding receptive field. For example, a filter of the convolutional hidden layer 1222a can begin in the top-left corner of the input image array and can convolve around the input image. As noted above, each convolutional iteration of the filter can be considered a node or neuron of the convolutional hidden layer 1222a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1222a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1222a.

The mapping from the input layer to the convolutional hidden layer 1222a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1222a can include several activation maps in order to identify multiple features in an image. The example shown in FIG. 12 includes three activation maps. Using three activation maps, the convolutional hidden layer 1222a can detect three different kinds of features, with each feature being detectable across the entire image.

In some examples, a non-linear hidden layer can be applied after the convolutional hidden layer 1222a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1200 without affecting the receptive fields of the convolutional hidden layer 1222a.

The pooling hidden layer 1222b can be applied after the convolutional hidden layer 1222a (and after the non-linear hidden layer when used). The pooling hidden layer 1222b is used to simplify the information in the output from the convolutional hidden layer 1222a. For example, the pooling hidden layer 1222b can take each activation map output from the convolutional hidden layer 1222a and generates a condensed activation map (or feature map) using a pooling function. Max-pooling is one example of a function performed by a pooling hidden layer. Other forms of pooling functions be used by the pooling hidden layer 1222a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1222a. In the example shown in FIG. 12, three pooling filters are used for the three activation maps in the convolutional hidden layer 1222a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1222a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1222a having a dimension of 24×24 nodes, the output from the pooling hidden layer 1222b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1222b to every one of the output nodes in the output layer 1224. Using the example above, the input layer includes 28×28 nodes encoding the pixel intensities of the input image, the convolutional hidden layer 1222a includes 3×24×24 hidden feature nodes based on application of a 5×5 local receptive field (for the filters) to three activation maps, and the pooling hidden layer 1222b includes a layer of 3×12×12 hidden feature nodes based on application of max-pooling filter to 2×2 regions across each of the three feature maps. Extending this example, the output layer 1224 can include ten output nodes. In such an example, every node of the 3×12×12 pooling hidden layer 1222b is connected to every node of the output layer 1224.

The fully connected layer 1222c can obtain the output of the previous pooling hidden layer 1222b (which should represent the activation maps of high-level features) and determines the features that most correlate to a particular class. For example, the fully connected layer 1222c layer can determine the high-level features that most strongly correlate to a particular class, and can include weights (nodes) for the high-level features. A product can be computed between the weights of the fully connected layer 1222c and the pooling hidden layer 1222b to obtain prob-abilities for the different classes. For example, if the CNN 1200 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1224 can include an M-dimensional vector (in the prior example, M=10). M indicates the number of classes that the CNN 1200 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 13:
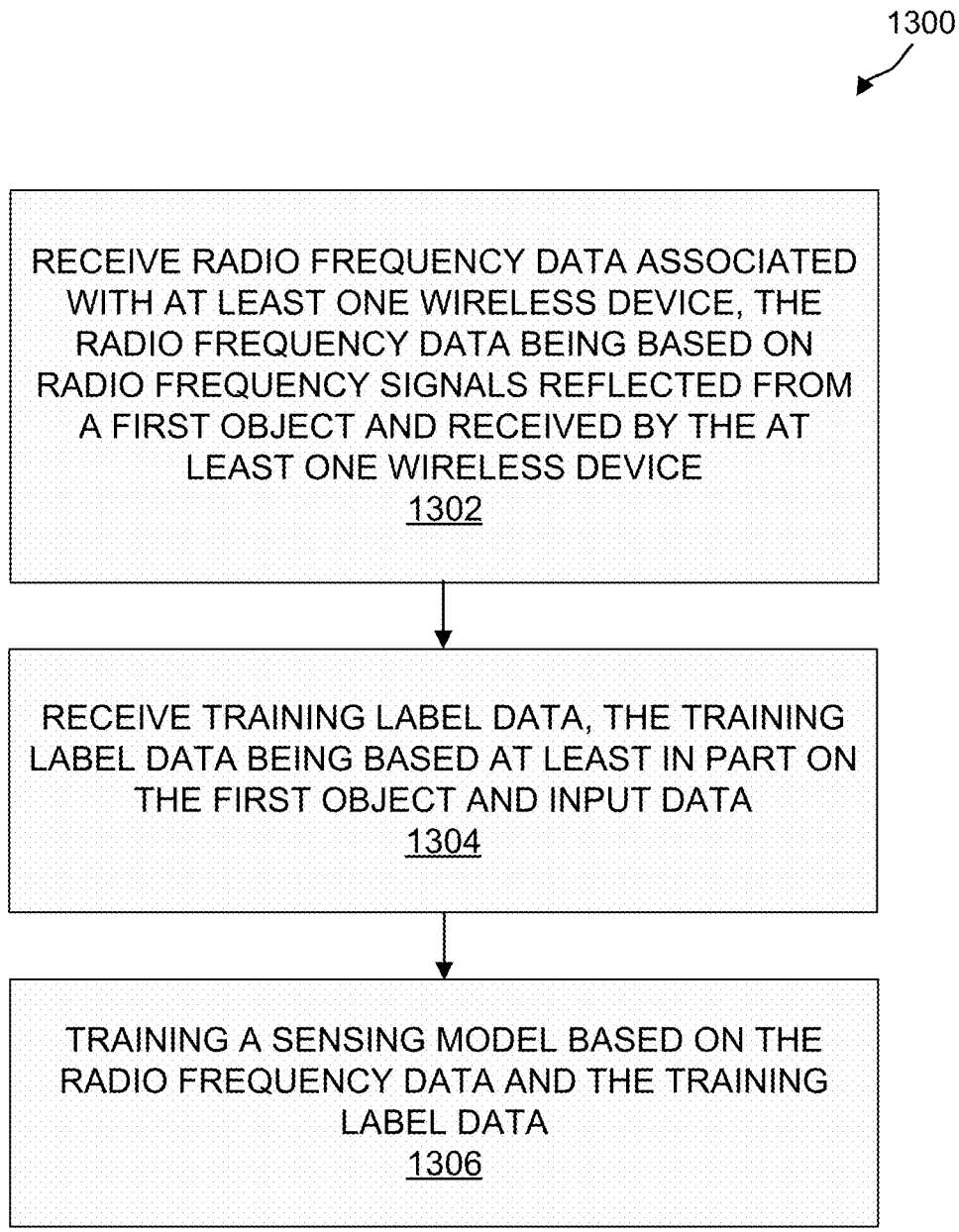
FIG. 13 illustrates an example flow diagram of a process for training one or more sensing models, in accordance with some examples.

FIG. 13 illustrates an example flow diagram of a process 1300 for training one or more sensing models, in accordance with some examples of the present disclosure. At operation 1302, the process 1300 can include receiving radio frequency data associated with at least one wireless device. The radio frequency data is based on radio frequency signals reflected from a first object and received by the at least one wireless device.

At operation 1304, the process 1300 can include obtaining (e.g., receiving) training label data (e.g., from a labeling device and/or from the at least one wireless device). The training label data is based at least in part on the first object and input data (e.g., received by the labeling device and/or by the at least one wireless device). In some aspects, the training label data can include information indicating at least one of an action associated with the first object, a location associated with the first object, or a combination thereof. In some cases, the input data (e.g., received by the labeling device and/or by the at least one wireless device) can include at least one of a selection of text by a user, an audio input provided by a user, or a combination thereof. In some cases, the input data can include at least one of biometric data for a user (e.g., associated with the labeling device and/or by the at least one wireless device), identity data for the user, or a combination thereof. In some examples, a time synchronization can be maintained between the wireless device and the labeling device. In one illustrative example, the time synchronization can be maintained using a Network Time Protocol (NTP).

As noted above, the training label data can be received from a labeling device and/or from the at least one wireless device. In some implementations, the labeling device and/or the at least one wireless device can include a camera that is configured to capture one or more images of a location of interest associated with the first object, one or more videos of the location of interest associated with the first object, or a combination thereof. In some implementations, the labeling device and/or the at least one wireless device can include a camera and a simultaneous localization and mapping (SLAM) system to simultaneously generate the training label data with the camera and to determine a location of the labeling device.

At operation 1306, the process 1300 can include generating (e.g., by training) a sensing model based on the radio frequency data and the training label data. In some aspects, the sensing model can include a machine-learning model. The machine-learning model can be a Convolutional Neural Network (CNN).

In some implementations, the process 1300 can further include receiving radio frequency data associated with a second object, providing the radio frequency data to the sensing model, and receiving, from the sensing model, one or more inference labels associated with the second object. In some aspects, the one or more inference labels can include information indicating a location associated with the second object, an action associated with the second object, or a combination thereof.

In some examples, the processes described herein (e.g., process 1300 and/or other process described herein) may be performed by a computing device or apparatus. In one example, the process 1300 can be performed by a computing device or the computing system 1400 shown in FIG. 14.

The computing device can include any suitable UE or device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1300. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

The process 1300 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
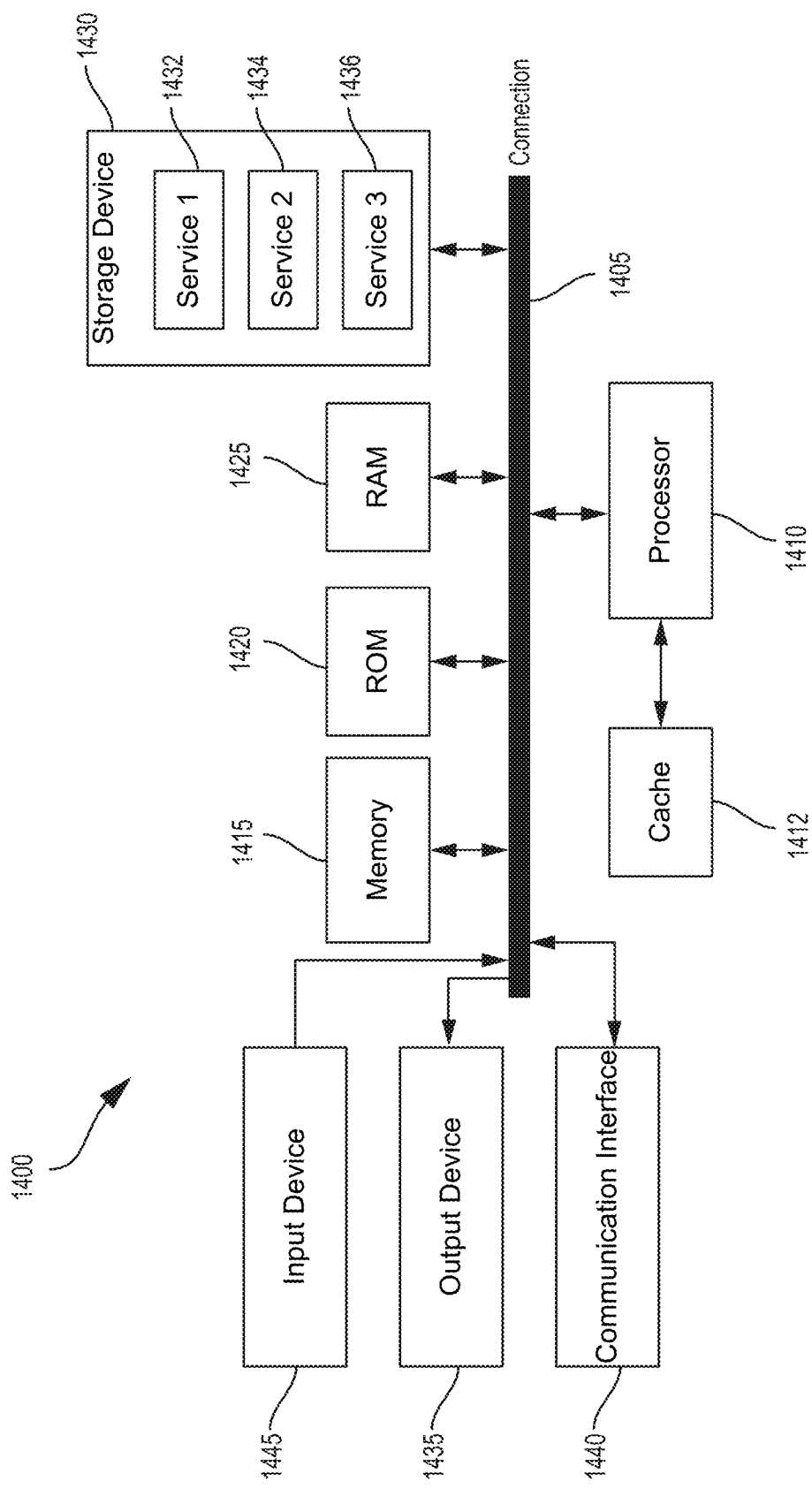
FIG. 14 illustrates an example computing system, in accordance with some examples.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include the following:

Aspect 1: An apparatus for training one or more sensing models, the apparatus comprising: at least one network interface; at least one memory; and at least one processor coupled to the at least one memory. The at least one processor is configured to: receive, via the at least one network interface, radio frequency data associated with at least one wireless device, the radio frequency data being based on radio frequency signals reflected from a first object and received by the at least one wireless device; obtain training label data, the training label data being based at least in part on the first object and input data; and generate a sensing model based on the radio frequency data and the training label data.

Aspect 2: The apparatus of aspect 1, wherein the training label data comprises information indicating at least one of an action associated with the first object, a location associated with the first object, or a combination thereof.

Aspect 3: The apparatus of any one of aspects 1 or 2, wherein the input data comprises at least one of a selection of text by a user, an audio input provided by a user, or a combination thereof.

Aspect 4: The apparatus of any one of aspects 1 to 3, wherein the input data comprises at least one of biometric data for a user, identity data for the user, or a combination thereof.

Aspect 5: The apparatus of any one of aspects 1 to 4, wherein a time synchronization is maintained between the wireless device and the labeling device.

Aspect 6: The apparatus of any one of aspects 1 to 5, wherein the training label data is received from a labeling device.

Aspect 7: The apparatus of aspect 6, wherein the labeling device comprises a camera that is configured to capture one or more images of a location of interest associated with the first object, one or more videos of the location of interest associated with the first object, or a combination thereof.

Aspect 8: The apparatus of any one of aspects 6 or 7, wherein the labeling device comprises a camera and a simultaneous localization and mapping (SLAM) system to simultaneously generate the training label data with the camera and to determine a location of the labeling device.

Aspect 9: The apparatus of any one of aspects 1 to 8, wherein the training label data is received from the at least one wireless device.

Aspect 10: The apparatus of aspect 9, wherein the at least one wireless device comprises a camera that is configured to capture one or more images of a location of interest associated with the first object, one or more videos of the location of interest associated with the first object, or a combination thereof.

Aspect 11: The apparatus of any one of aspects 9 or 10, wherein the at least one wireless device comprises a camera and a simultaneous localization and mapping (SLAM) system to simultaneously generate the training label data with the camera and to determine a location of the labeling device.

Aspect 12: The apparatus of any one of aspects 1 to 11, wherein the sensing model comprises a machine-learning model.

Aspect 13: The apparatus of aspect 12, wherein the machine-learning model is a Convolutional Neural Network (CNN).

Aspect 14: The apparatus of any one of aspects 1 to 13, wherein the at least one processor is further configured to: receive radio frequency data associated with a second object; provide the radio frequency data to the sensing model; and receive, from the sensing model, one or more inference labels associated with the second object.

Aspect 15: The apparatus of aspect 14, wherein the one or more inference labels comprises information indicating a location associated with the second object, an action associated with the second object, or a combination thereof.

Aspect 16: A method for training one or more sensing models, the method comprising: receiving radio frequency data associated with at least one wireless device, the radio frequency data being based on radio frequency signals reflected from a first object and received by the at least one wireless device; obtaining training label data, the training label data being based at least in part on the first object and input data; and generating a sensing model based on the radio frequency data and the training label data.

Aspect 17: The method of aspect 16, wherein the training label data comprises information indicating at least one of an action associated with the first object, a location associated with the first object, or a combination thereof.

Aspect 18: The method of any one of aspects 16 or 17, wherein the input data comprises at least one of a selection of text by a user, an audio input provided by a user, or a combination thereof.

Aspect 19: The method of any one of aspects 16 to 18, wherein the input data comprises at least one of biometric data for a user, identity data for the user, or a combination thereof.

Aspect 20: The method of any one of aspects 16 to 19, wherein a time sync is maintained between the wireless device and the labeling device.

Aspect 21: The method of any one of aspects 16 to 20, wherein the training label data is received from a labeling device.

Aspect 22: The method of aspect 21, wherein the labeling device comprises a camera that is configured to capture one or more images of a location of interest associated with the first object, one or more videos of the location of interest associated with the first object, or a combination thereof.

Aspect 23: The method of any one of aspects 21 or 22, wherein the labeling device comprises a camera and a simultaneous localization and mapping (SLAM) system to simultaneously generate the training label data with the camera and to determine a location of the labeling device.

Aspect 24: The method of any one of aspects 16 to 23, wherein the training label data is received from the at least one wireless device.

Aspect 25: The method of aspect 24, wherein the at least one wireless device comprises a camera that is configured to capture one or more images of a location of interest associated with the first object, one or more videos of the location of interest associated with the first object, or a combination thereof.

Aspect 26: The method of any one of aspects 24 or 25, wherein the at least one wireless device comprises a camera and a simultaneous localization and mapping (SLAM) system to simultaneously generate the training label data with the camera and to determine a location of the labeling device.

Aspect 27: The method of any one of aspects 16 to 26, wherein the sensing model comprises a machine-learning model.

Aspect 28: The method of aspect 27, wherein the machine-learning model is a Convolutional Neural Network (CNN).

Aspect 29: The method of any one of aspects 16 to 28, further comprising: receiving radio frequency data associated with a second object; providing the radio frequency data to the sensing model; and receiving, from the sensing model, one or more inference labels associated with the second object.

Aspect 30: The method of aspect 29, wherein the one or more inference labels comprises information indicating a location associated with the second object, an action associated with the second object, or a combination thereof.

Aspect 31: A non-transitory computer-readable storage medium comprising at least one instruction for causing a computer or processor to: receive radio frequency data associated with at least one wireless device, the radio frequency data being based on radio frequency signals reflected from a first object and received by the at least one wireless device; obtain training label data, the training label data being based at least in part on the first object and input data; and generate a sensing model based on the radio frequency data and the training label data.

Aspect 32: The non-transitory computer-readable storage medium of aspect 31, wherein the training label data comprises at least one of an action associated with the first object, a location associated with the first object, or a combination thereof.

Aspect 33: The non-transitory computer-readable storage medium of any one of aspects 31 or 32, wherein the input data comprises at least one of a selection of text by a user, an audio input provided by a user, or a combination thereof.

Aspect 34: The non-transitory computer-readable storage medium of any one of aspects 31 to 33, wherein the input data comprises at least one of biometric data for a user, identity data for the user, or a combination thereof.

Aspect 35: The non-transitory computer-readable storage medium of any one of aspects 31 to 34, wherein a time sync is maintained between the wireless device and the labeling device.

Aspect 36: The non-transitory computer-readable storage medium of any one of aspects 31 to 35, wherein the training label data is received from a labeling device.

Aspect 37: The non-transitory computer-readable storage medium of aspect 36, wherein the labeling device comprises a camera that is configured to capture one or more images of a location of interest associated with the first object, one or more videos of the location of interest associated with the first object, or a combination thereof.

Aspect 38: The non-transitory computer-readable storage medium of any one of aspects 36 or 37, wherein the labeling device comprises a camera and a simultaneous localization and mapping (SLAM) system to simultaneously generate the training label data with the camera and to determine a location of the labeling device.

Aspect 39: The non-transitory computer-readable storage medium of any one of aspects 31 to 38, wherein the training label data is received from the at least one wireless device.

Aspect 40: The non-transitory computer-readable storage medium of aspect 39, wherein the at least one wireless device comprises a camera that is configured to capture one or more images of a location of interest associated with the first object, one or more videos of the location of interest associated with the first object, or a combination thereof.

Aspect 41: The non-transitory computer-readable storage medium of any one of aspects 39 or 40, wherein the at least one wireless device comprises a camera and a simultaneous localization and mapping (SLAM) system to simultaneously generate the training label data with the camera and to determine a location of the labeling device.

Aspect 42: The non-transitory computer-readable storage medium of any one of aspects 31 to 42, wherein the sensing model comprises a machine-learning model.

Aspect 43: The non-transitory computer-readable storage medium of aspect 42, wherein the machine-learning model is a Convolutional Neural Network (CNN).

Aspect 44: The non-transitory computer-readable storage medium of any one of aspects 31 to 43, further comprising at least one instruction for causing the computer or the processor to: receive radio frequency data associated with a second object; provide the radio frequency data to the sensing model; and receive, from the sensing model, one or more inference labels associated with the second object.

Aspect 45: The non-transitory computer-readable storage medium of aspect 44, wherein the one or more inference labels comprises information indicating a location associated with the second object, an action associated with the second object, or a combination thereof.

Aspect 46: An apparatus for training one or more sensing models, the apparatus comprising: means for receiving radio frequency data associated with at least one wireless device, the radio frequency data being based on radio frequency signals reflected from a first object and received by the at least one wireless device; means for obtaining training label data, the training label being based at least in part on the first object and input data; and means for generating a sensing model based on the radio frequency data and the training label data.

Aspect 47: The apparatus of aspect 46, wherein the training label data comprises information indicating an action associated with the first object, a location associated with the first object, or a combination thereof.

Aspect 48: The apparatus of any one of aspects 46 or 47, wherein the input data comprises one or more of: a selection of text by a user, an audio input provided by a user, or a combination thereof.

Aspect 49: The apparatus of any one of aspects 46 to 48, wherein the input data comprises one or more of biometric data, identity data for the user, or a combination thereof.

Aspect 50: The apparatus of any one of aspects 46 to 49, wherein a time sync is maintained between the wireless device and the labeling device.

Aspect 51: The apparatus of any one of aspects 46 to 50, wherein the training label data is received from a labeling device.

Aspect 52: The apparatus of aspect 51, wherein the labeling device comprises a camera that is configured to capture one or more images of a location of interest associated with the first object, one or more videos of the location of interest associated with the first object, or a combination thereof.

Aspect 53: The apparatus of any one of aspects 51 or 52, wherein the labeling device comprises a camera and a simultaneous localization and mapping (SLAM) system to simultaneously generate the training label data with the camera and to determine a location of the labeling device.

Aspect 54: The apparatus of any one of aspects 46 to 53, wherein the training label data is received from the at least one wireless device.

Aspect 55: The apparatus of aspect 54, wherein the at least one wireless device comprises a camera that is configured to capture one or more images of a location of interest associated with the first object, one or more videos of the location of interest associated with the first object, or a combination thereof.

Aspect 56: The apparatus of any one of aspects 54 or 55, wherein the at least one wireless device comprises a camera and a simultaneous localization and mapping (SLAM) system to simultaneously generate the training label data with the camera and to determine a location of the labeling device.

Aspect 57: The apparatus of any one of aspects 46 to 56, wherein the sensing model comprises a machine-learning model.

Aspect 58: The apparatus of aspect 57, wherein the machine-learning model is a Convolutional Neural Network (CNN).

Aspect 59: The apparatus of any one of aspects 46 to 58, further comprising: means for receiving radio frequency data associated with a second object; means for providing the radio frequency data to the sensing model; and means for receiving, from the sensing model, one or more inference labels associated with the second object.

Aspect 60: The apparatus of aspect 59, wherein the one or more inference labels comprises information indicating a location associated with the second object, an action associated with the second object, or a combination thereof.

What is claimed is:

1. An apparatus for training one or more sensing models, the apparatus comprising:
   at least one network interface;
   at least one memory; and
   at least one processor coupled to the at least one memory, the at least one processor being configured to:
   receive, via the at least one network interface, radio frequency data associated with at least one wireless device, the radio frequency data being based on radio frequency signals reflected from a first object and received by the at least one wireless device;
   obtain training label data, the training label data being based at least in part on the first object and input data; and
   generate a sensing model based on the radio frequency data and the training label data, wherein the training label data is received in real-time from a labeling device, the labeling device comprises a camera and a simultaneous localization and mapping (SLAM) system to simultaneously generate the training label data with the camera and to determine a location of the labeling device, wherein the camera is further configured to track orientation of the labeling device and provide the location and the orientation of the labeling device to generate the training label data.

2. The apparatus of claim 1, wherein the training label data comprises information indicating at least one of an action associated with the first object, a location associated with the first object, or a combination thereof.

3. The apparatus of claim 1, wherein the input data comprises at least one of a selection of text by a user, an audio input provided by a user, or a combination thereof.

4. The apparatus of claim 1, wherein the input data comprises at least one of biometric data for a user, identity data for the user, or a combination thereof.

5. The apparatus of claim 1, wherein a time synchronization is maintained between the wireless device and the labeling device.

6. The apparatus of claim 1, wherein the camera is configured to capture one or more images of a location of interest associated with the first object, one or more videos of the location of interest associated with the first object, or a combination thereof.

7. The apparatus of claim 1, wherein the training label data is received from the at least one wireless device.

8. The apparatus of claim 7, wherein the at least one wireless device comprises a camera that is configured to capture one or more images of a location of interest associated with the first object, one or more videos of the location of interest associated with the first object, or a combination thereof.

9. The apparatus of claim 7, wherein the at least one wireless device comprises a camera and a simultaneous localization and mapping (SLAM) system to simultaneously generate the training label data with the camera and to determine a location of the labeling device.

10. The apparatus of claim 1, wherein the sensing model comprises a machine-learning model.

11. The apparatus of claim 10, wherein the machine-learning model is a Convolutional Neural Network (CNN).

12. The apparatus of claim 1, wherein the at least one processor is further configured to:
    receive radio frequency data associated with a second object;
    provide the radio frequency data to the sensing model; and
    receive, from the sensing model, one or more inference labels associated with the second object.

13. The apparatus of claim 12, wherein the one or more inference labels comprises information indicating a location associated with the second object, an action associated with the second object, or a combination thereof.

14. A method for training one or more sensing models, the method comprising:
- receiving radio frequency data associated with at least one wireless device, the radio frequency data being based on radio frequency signals reflected from a first object and received by the at least one wireless device;
- obtaining training label data, the training label data being based at least in part on the first object and input data; and
- generating a sensing model based on the radio frequency data and the training label data, wherein the training label data is received in real-time from a labeling device, the labeling device comprises a camera and a simultaneous localization and mapping (SLAM) system to simultaneously generate the training label data with the camera and to determine a location of the labeling device, wherein the camera is further configured to track orientation of the labeling device and provide the location and the orientation of the labeling device to generate the training label data.

15. The method of claim 14, wherein the training label data comprises information indicating at least one of an action associated with the first object, a location associated with the first object, or a combination thereof.

16. The method of claim 14, wherein the input data comprises at least one of a selection of text by a user, an audio input provided by a user, or a combination thereof.

17. The method of claim 14, wherein the input data comprises at least one of biometric data for a user, identity data for the user, or a combination thereof.

18. The method of claim 14, wherein a time sync is maintained between the wireless device and the labeling device.

19. The method of claim 14, wherein the camera is configured to capture one or more images of a location of interest associated with the first object, one or more videos of the location of interest associated with the first object, or a combination thereof.

20. The method of claim 14, wherein the training label data is received from the at least one wireless device.

21. The method of claim 20, wherein the at least one wireless device comprises a camera that is configured to capture one or more images of a location of interest associated with the first object, one or more videos of the location of interest associated with the first object, or a combination thereof.

22. The method of claim 20, wherein the at least one wireless device comprises a camera and a simultaneous localization and mapping (SLAM) system to simultaneously generate the training label data with the camera and to determine a location of the labeling device.

23. The method of claim 14, wherein the sensing model comprises a machine-learning model.

24. The method of claim 23, wherein the machine-learning model is a Convolutional Neural Network (CNN).

25. The method of claim 14, further comprising:
- receiving radio frequency data associated with a second object;
- providing the radio frequency data to the sensing model; and
- receiving, from the sensing model, one or more inference labels associated with the second object.

26. The method of claim 25, wherein the one or more inference labels comprises information indicating a location associated with the second object, an action associated with the second object, or a combination thereof.

27. A non-transitory computer-readable storage medium comprising at least one instruction for causing a computer or processor to:
- receive radio frequency data associated with at least one wireless device, the radio frequency data being based on radio frequency signals reflected from a first object and received by the at least one wireless device;
- obtain training label data, the training label data being based at least in part on the first object and input data; and
- generate a sensing model based on the radio frequency data and the training label data, wherein the training label data is received in real-time from a labeling device, the labeling device comprises a camera and a simultaneous localization and mapping (SLAM) system to simultaneously generate the training label data with the camera and to determine a location of the labeling device, wherein the camera is further configured to track orientation of the labeling device and provide the location and the orientation of the labeling device to generate the training label data.

28. The non-transitory computer-readable storage medium of claim 27, wherein the training label data comprises at least one of an action associated with the first object, a location associated with the first object, or a combination thereof.

29. The non-transitory computer-readable storage medium of claim 27, wherein the input data comprises at least one of a selection of text by a user, an audio input provided by a user, or a combination thereof.

30. The non-transitory computer-readable storage medium of claim 27, wherein the input data comprises at least one of biometric data for a user, identity data for the user, or a combination thereof.

31. The non-transitory computer-readable storage medium of claim 27, wherein a time sync is maintained between the wireless device and the labeling device.

32. The non-transitory computer-readable storage medium of claim 27, wherein the camera is configured to capture one or more images of a location of interest associated with the first object, one or more videos of the location of interest associated with the first object, or a combination thereof.

33. The non-transitory computer-readable storage medium of claim 27, wherein the training label data is received from the at least one wireless device.

34. The non-transitory computer-readable storage medium of claim 33, wherein the at least one wireless device comprises a camera that is configured to capture one or more images of a location of interest associated with the first object, one or more videos of the location of interest associated with the first object, or a combination thereof.

35. The non-transitory computer-readable storage medium of claim 33, wherein the at least one wireless device comprises a camera and a simultaneous localization and mapping (SLAM) system to simultaneously generate the training label data with the camera and to determine a location of the labeling device.

36. The non-transitory computer-readable storage medium of claim 27, wherein the sensing model comprises a machine-learning model.

37. The non-transitory computer-readable storage medium of claim 36, wherein the machine-learning model is a Convolutional Neural Network (CNN).

38. The non-transitory computer-readable storage medium of claim 27, further comprising at least one instruction for causing the computer or the processor to:

receive radio frequency data associated with a second object;

provide the radio frequency data to the sensing model; and receive, from the sensing model, one or more inference labels associated with the second object.

39. The non-transitory computer-readable storage medium of claim 38, wherein the one or more inference labels comprises information indicating a location associated with the second object, an action associated with the second object, or a combination thereof.

40. An apparatus for training one or more sensing models, the apparatus comprising:

means for receiving radio frequency data associated with at least one wireless device, the radio frequency data being based on radio frequency signals reflected from a first object and received by the at least one wireless device;

means for obtaining training label data, the training label being based at least in part on the first object and input data; and means for generating a sensing model based on the radio frequency data and the training label data, wherein the training label data is received in real-time from a labeling device, the labeling device comprises a camera and a simultaneous localization and mapping (SLAM) system to simultaneously generate the training label data with the camera and to determine a location of the labeling device, wherein the camera is further configured to track orientation of the labeling device and provide the location and the orientation of the labeling device to generate the training label data.

41. The apparatus of claim 40, wherein the training label data comprises information indicating an action associated with the first object, a location associated with the first object, or a combination thereof.

42. The apparatus of claim 40, wherein the input data comprises one or more of: a selection of text by a user, an audio input provided by a user, or a combination thereof.

43. The apparatus of claim 40, wherein the input data comprises one or more of biometric data, identity data for the user, or a combination thereof.

44. The apparatus of claim 40, wherein a time sync is maintained between the wireless device and the labeling device.

45. The apparatus of claim 40, wherein the camera is configured to capture one or more images of a location of interest associated with the first object, one or more videos of the location of interest associated with the first object, or a combination thereof.

46. The apparatus of claim 40, wherein the training label data is received from the at least one wireless device.

47. The apparatus of claim 46, wherein the at least one wireless device comprises a camera that is configured to capture one or more images of a location of interest associated with the first object, one or more videos of the location of interest associated with the first object, or a combination thereof.

48. The apparatus of claim 46, wherein the at least one wireless device comprises a camera and a simultaneous localization and mapping (SLAM) system to simultaneously generate the training label data with the camera and to determine a location of the labeling device.

49. The apparatus of claim 40, wherein the sensing model comprises a machine-learning model.

50. The apparatus of claim 49, wherein the machine-learning model is a Convolutional Neural Network (CNN).

51. The apparatus of claim 40, further comprising:

means for receiving radio frequency data associated with a second object;

means for providing the radio frequency data to the sensing model; and means for receiving, from the sensing model, one or more inference labels associated with the second object.

52. The apparatus of claim 51, wherein the one or more inference labels comprises information indicating a location associated with the second object, an action associated with the second object, or a combination thereof.

53. An apparatus for training one or more sensing models, the apparatus comprising:

at least one network interface;

at least one memory; and at least one processor coupled to the at least one memory, the at least one processor being configured to:

receive, via the at least one network interface, radio frequency data associated with at least one wireless device, the radio frequency data being based on radio frequency signals reflected from a first object and received by the at least one wireless device;

obtain training label data, the training label data being based at least in part on the first object and input data; and generate a sensing model based on the radio frequency data and the training label data, wherein the training label data is received in real-time from a labeling device, the labeling device comprises a camera that is configured to perform visual and inertial odometry to determine a pose of the camera and provide the determined pose to generate the training label data.

54. The apparatus of claim 53, wherein the pose of the camera comprises location and orientation of the camera.

55. The apparatus of claim 54, wherein the location and orientation of the camera are used as a label to perform object detection and labeling.

56. The apparatus of claim 54, wherein the labeling device updates a map of a environment based on information captured by the camera, and the pose of the camera is tracked as the labeling device updates the map of the environment.

* * * * *